(12) United States Patent
Poltorak

(10) Patent No.: US 7,606,757 B1
(45) Date of Patent: Oct. 20, 2009

(54) METHOD AND SYSTEM FOR PATENT VALUATION

(76) Inventor: Alexander I. Poltorak, 128 W. Maple Ave., Monsey, NY (US) 10952

(*) Notice: Subject to any disclaimer, the term of this patent is extended or adjusted under 35 U.S.C. 154(b) by 1211 days.

(21) Appl. No.: 10/638,802

(22) Filed: Aug. 11, 2003

(51) Int. Cl.
*G06Q 40/00* (2006.01)
(52) U.S. Cl. ................................. 705/36 R
(58) Field of Classification Search ............ None
See application file for complete search history.

(56) References Cited

U.S. PATENT DOCUMENTS

| | | | | |
|---|---|---|---|---|
| 5,999,907 A | * | 12/1999 | Donner | 705/1 |
| 6,154,725 A | * | 11/2000 | Donner | 705/1 |
| 6,263,314 B1 | * | 7/2001 | Donner | 705/1 |
| 6,556,992 B1 | * | 4/2003 | Barney et al. | 707/6 |
| 6,665,656 B1 | * | 12/2003 | Carter | 707/3 |

* cited by examiner

*Primary Examiner*—Hani Kazimi
*Assistant Examiner*—Olabode Akintola
(74) *Attorney, Agent, or Firm*—Anatoly S. Weiser, Esq.

(57) ABSTRACT

Patent valuation method uses discounted present value analysis and statistical risk adjustment techniques to compute an estimate of the value of a patent or portfolio of patents. The present value of the projected incremental annual income generated by the patent monopoly is adjusted for the probabilities of actual infringement, the owner's willingness and ability to enforce the patent rights, and the probabilities that the individual patents will be held not invalid, not unenforceable, and infringed. A formal matrix approach is used to construct a patent portfolio weight matrix and arrive at an estimate of the relative values of the individual patents within the portfolio.

96 Claims, 11 Drawing Sheets

METHOD AND SYSTEM FOR PATENT VALUATION

REFERENCE TO RELATED APPLICATION

This application claims priority benefit of provisional U.S. Patent Application Ser. No. 60/380,235, entitled On Patent Valuation, filed 13 May 2002; and of U.S. patent application Ser. No. 10/437,547. Both applications are hereby incorporated by reference.

BACKGROUND OF THE INVENTION

1. Field of the Invention

The present invention relates generally to methods, systems, and articles of manufacture for analyzing patent-related information, computing patent valuation information and determining values of patents and patent portfolios, and, in particular, to methods, data processing systems, and articles of manufacture for determining the value of a patent or patent portfolio based on computed patent valuation information.

2. Background

Intellectual Property (often referred to as "IP") plays a key role in many fields of business and can be very valuable. Modern market trends, especially those of the past two decades, have shown an increased awareness and understanding of the need for determining value of intangible assets in general and of intellectual property assets in particular. See Gordon V. Smith & Russell L. Parr, *Valuation of Intellectual Property and Intangible Assets* (John Wiley & Sons, Inc., New York, 1989).

The necessity to value a patent manifests itself many times during the patent's life and even before an application for the patent is filed. Initially, a decision must be made whether to file a patent application or keep the invention as a trade secret. It may be advantageous to repeat the valuation one or more times during the prosecution of the patent application to reflect the changing probabilities of issuance of the desired patent, particularly before the patent application is published. Valuation may be repeated again before the patent issue fee is paid, and yet again before each payment of periodic maintenance fees. Once issued, a patent may need to be valued in the context of a sale, an exclusive or non-exclusive licensing transaction, settlement of patent infringement litigation, patent sale and lease- or license-back transaction, charitable donation to a university or another non-profit institution, or post-issuance proceedings in the Patent & Trademark Office, such as reissue and reexamination proceedings A patent may also need to be valued during a public offering, venture capital transaction, merger, acquisition, divestiture, bankruptcy or other capital restructuring events of the entity that owns the patent, or when the patent is pledged as collateral for a loan.

While all intellectual property assets are subject to unforeseen factors and managerial decisions regarding licensing and sale, patents are subject to a particularly wide range of decisions, both during the application process and following grant. Thus, patents exhibit a high degree of uncertainty as to their eventual value. See Robert Pitkethly, *The Valuation of Patents. A Review of Patent Valuation Methods with Consideration of Option Based Methods and the Potential for Further Research* (Judge Institute Working Paper WP 21/97, The Judge Institute of Management Studies, Cambridge, UK, 1997), incorporated herein by reference. Patent valuation is particularly difficult because of two factors: (1) the uncertainties about both the technical and commercial successes of the underlying technology in competitive markets, and (2) the potential for legal challenges that can occur both during the commercial application of the patented technology and during subsequent patent enforcement efforts.

The absence of efficient markets for trading patents—markets with many buyers, many sellers, and wide availability of information affecting prices—makes it difficult to value patents. Many consultants, writers, and other experts on the subject of patent valuation have proposed assigning a value to a patent by using techniques that seem to be reasonably well suited for the valuation of technology, but that appear to be ill suited for the valuation of patents protecting technology. Typically, when called upon to value a particular patent or patent portfolio, these experts value the underlying technology and present the result as the value of the patent or portfolio. Technology, however, is distinct from the patents that it underlies. Technology is knowledge that deals with applied science, engineering, or business methods as distinguished from patents, which are legal rights of exclusion. Technology can exist independent of patents and may be protected by other types of IP such trade secrets and know-how, for example. Therefore, the methods of valuation applicable to a technology may not provide adequate results when applied to valuation of the patents protecting the technology.

Another approach employed to value patents is the application of the "real options pricing theory" and the so-called Black-Scholes equation. In this approach, a parallel is drawn between the commodity-option relationship and technology-patent relationship. It is argued that what works (or should work) in valuing options, should also work in valuing patents. A patent, however, is unlike a commodity option in that it grants no affirmative rights, but rather it grants a negative right: the right to exclude others from exploiting the patented invention. The parallel between commodity options and patents, therefore, is not entirely justified, and the Black-Scholes pricing approach may not yield satisfactory results in many circumstances when it is applied to valuation of patents. This is not to say that a real option approach is not at all applicable to patents. When an inventor (or a manger) makes a decision to file a patent application, he or she thereby acquires an option on paying the issue fee (if the patent is allowed) and having the patents issue. Paying the issue fee, one acquires an option on a subsequent decision to pay a maintenance fee to keep the patent alive, etc. Although, a patent is not an option on the patented technology, a patent may be viewed as an option on enforcing patent monopoly, i.e. an option to file a lawsuit for patent infringement.

A need thus exists for intellectual property valuation methods that are based on the attributes of the property valued. A further need exists for intellectual property valuation techniques that produce analytical results reflective of real world risks, opportunities, and outcomes. Still another need exists for assigning relative values to individual patents of a portfolio that protects one or more technologies.

SUMMARY

The present invention is directed to methods and systems that satisfy these needs. In one manifestation, a method for computing a patent valuation estimate for a patent portfolio is disclosed. The applicable period of the portfolio is broken into subperiods, such as years, months, or weeks. For each of these years, a determination is made of the expected annual (i.e., subperiodic) incremental profits derived from the patent monopoly provided by the patent portfolio. In one version, the profits are calculated as the unit volume multiplied by the difference between the unit price of the units covered by the monopoly sold and the unit cost of goods that are required to produce the units. Note that "goods" here can be products, processes, services, business methods, or anything else covered by the patent monopoly from which revenue is derived. A second determination of the profits is made for a hypothetical case of freely-competitive environment in absence of or without regard to the patent monopoly. The difference between the profits under the patent monopoly and the profits in the hypothetical case of no monopoly is then considered as the incremental value of the patent portfolio during a given subperiod (e.g., year, month).

In another version, the incremental value is simply the royalties brought by the portfolio.

Next, applicable discount interest rates are determined (e.g., estimated) for each subperiod. Often, the discount rates can be assumed to be constant for all the subperiods.

Each of the incremental values is discounted to present value using the interest rate applicable to the year of the specific incremental value. Thus, the present value of the incremental value $\Delta_i$ of the $i^{th}$ year is discounted to yield the present value of $$\frac{\Delta_i}{(1+I_i)^i},$$

where $I_i$ is the interest rate to be applied to the $i^{th}$ year. The interest rates are determined to reflect not only the cost of funds, i.e., safe investments, but also the uncertainties associated with forecasting future revenues and other risks to the patent portfolio, such as potential future infringement.

The present values of all the discounted incremental values are then aggregated, that is added up, to yield the present value of the patent portfolio.

The process can be carried further to risk-adjust the estimated present value of the portfolio. The adjustment can account for the probability that the portfolio will be infringed by a competitor, the probability that the owner of the portfolio will not be willing or financially able to enforce the patent rights under the portfolio, and the probability that in the event of litigation against the infringer, the individual patents will be found not infringed, invalid, or unenforceable.

In one version, the adjustment is performed by multiplying the present value of the portfolio by the following adjustment factor:

$$\left(1 - G_i \times \left(1 - E_a \times E_w \times \left(1 - \prod_{j=1}^{n}(1 - F_v^j \times F_i^j \times F_e^j)\right)\right)\right).$$

Here, $G_i$ stands for the probability that the portfolio will be infringed during its lifetime (or another period applicable to the determination of the estimated value). The symbols $E_a$ and $E_w$ refer to the probabilities that the owner will be willing and financially able to enforce the portfolio, respectively. And the symbols $F_v^j$, $F_i^j$, and $F_e^j$ refer to the probabilities that the $j^{th}$ patent will be found valid, infringed, and enforceable, respectively.

In some versions, the probabilities $F_v^j$, $F_i^j$, and $F_e^j$ can be set to be constant across the patents of the portfolio; in other words, $F_v^j$=Constant A for all j; $F_i^j$=Constant B for all j; and $F_e^j$=Constant C for all j.

When patent validity/enforceability and infringement abatement insurance is available, the adjustment of the present value is carried slightly differently in some versions of the inventive methods. For example, if such patent infringement insurance is in place, each of the $E_a$ and $E_w$ probabilities can be set to unity. Moreover, if we deduct the cost of the patent validity insurance (for all patents in the portfolio) from the present value estimate of the portfolio, the probabilities $F_v^j$ and $F_e^j$ can be set to unity values as well, because there is no risk of financial loss due to invalidity or unenforceability up to the face value of the policy. The adjustment factor then becomes $$RAF = \left(1 - G_i \times \left(\prod_{j=1}^{n}(1 - F_i^j)\right)\right),$$

and the risk-adjusted present value estimate AdjPV(PP) is computed from the following formula: AdjPV(PP)=RAF×PV(PP)−InsPV, where PV(PP) is the unadjusted present value estimate, and InsPV is the present value of the insurance premium to be paid over the applicable period.

However the value of a patent portfolio of a plurality of n patents is estimated, a formal matrix approach can then be used to estimate the value of each constituent patent of the portfolio. A method of computing an estimate of value EV of a first patent of a patent portfolio over the applicable period can proceed as follows.

The value of the patent portfolio over the applicable period is obtained, for example, received as input to the computer system that performs the method, or computed from the information provided to the computer, possibly using one of the methods described or incorporated in this document or using any other method suitable to computing value estimate of a patent portfolio. The average value $\bar{V}$ of the patent portfolio during the subperiods of the applicable period is then calculated by dividing the value over the entire applicable period by the number of subperiods in the applicable period. For example, if the applicable period is 17 years, the average annual (i.e., subperiodic) value is one-seventeenth (1/17) of the value over the entire period.

A Patent Portfolio Matrix P is introduced to describe relative contributions of constituent patents to the overall portfolio. A plurality of matrix elements $p_i^j$, which are elements of the Patent Portfolio Matrix P, is generated for a portfolio weight matrix, each matrix element $p_i^j$ being essentially a weighted contribution of the $j^{th}$ patent of the patent portfolio to the value of the portfolio during the subperiod i. The matrix elements are generated so that the following relationship is satisfied for $1 \leq i \leq l$:

$$\sum_{j=1}^{n} p_i^j = K,$$

where K is a constant, e.g., one.

After the matrix elements are known for the first patent (the value of which is sought), a first patent weight index $p^1$ for the first patent is computed by aggregating, over all the subperiods of the applicable period, the matrix elements associated with the first patent. The value EV of the first patent can then be computed from the patent weight index $p^1$ and the average subperiodic value of the patent portfolio $\bar{V}$ from the following formula:

$$EV = \frac{P^1}{K} \times \bar{V}.$$

There are many ways to compute or assign the matrix elements to the various patents and subperiods. For example, the magnitude of a matrix element $p_i^j$ can depend on the length of the portion of the subperiod i during which the $j^{th}$ patent is active. Thus, if the $j^{th}$ patent expires in the middle of the year i, the matrix element for the patent and the year would be decreased as compared to a patent that is active throughout the full year, assuming all other characteristics of the two patents are the same. And the more patents are active throughout a given year, the less the contribution of each individual patent to the portfolio during the year, assuming once again that the patent characteristics are the same. Therefore, the magnitude of the matrix element for a patent during the given year is generally inversely related to the number of patents that are active during the given year.

Patent characteristics of course need not be assumed to be identical. For example, matrix elements can be increased for patents that have emerged relatively unscathed from reexamination proceedings, and for patents whose validity has been upheld in a previous litigation.

These and other features and aspects of the present invention will be better understood with reference to the following description and appended claims.

DETAILED DESCRIPTION

Figure 1:
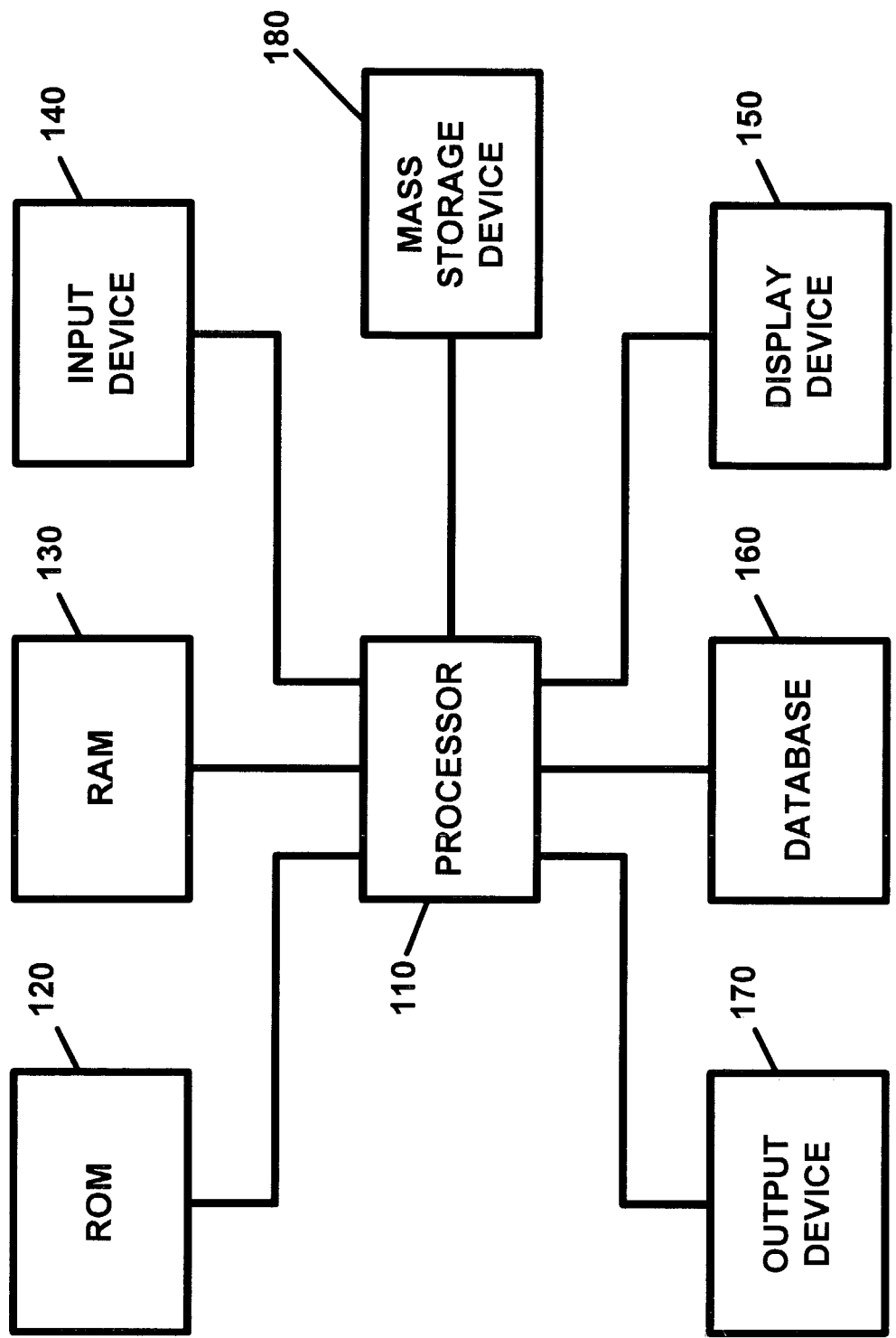
FIG. 1 illustrates an embodiment of an apparatus in accordance with the present invention, in simplified block diagram form.

Reference will now be made in detail to several versions of the invention that are illustrated in the accompanying drawings. Wherever possible, same or similar reference numerals are used in the drawings and the description to refer to the same or like parts or steps. The drawings are in simplified form and are not to precise scale.

Referring more particularly to the drawings, FIG. 1 is a simplified block diagram representation of a valuation system 100 in accordance with the present invention. The figure does not show many of the system's hardware and software modules, and omits many physical and logical connections. The system 100 can be implemented with a special purpose data processor, a general-purpose computer, a computer system, or a group of networked computers or computer systems configured to perform the steps of the methods of the invention, to generate and process patent valuation information and to assign value estimates to patents and patent portfolios. In one embodiment, the system 100 is built on a personal computer platform, such as a Wintel PC or a Mac computer. In another embodiment, the system 100 is a computer network within a client/server environment. In yet another embodiment the system 100 is implemented on the Internet, an intranet or an extranet.

The system 100 executes instructions causing it to perform the steps of the methods described below, receiving the inputs and producing the results as indicated. The instructions may take the form of program code embodied in tangible media, such as hard drives, floppy diskettes, CD-ROMS, DVD, or any other machine-readable storage medium. The program code can also be transmitted over a transmission medium, for example, over electrical wiring or cabling, through fiber optics, through the Internet, wirelessly, or via any other form of transmission.

With reference to FIG. 1, the system 100 includes a processor 110 that can perform the processing routines and control functions of the methods in accordance with the invention. The system 100 also includes memory arrays 120 and 130, and a mass storage device 180. In the illustrated embodiment, the memory array 120 is a read only memory (ROM) device, the memory array 130 is a random access memory (RAM) device, and the mass storage device 180 is a magnetic disk drive. The mass storage device 180 and each of the memory arrays 120 and 130 are connected to the processor 110.

A user input device 140 is used to enter data or commands into the system 100. The input device 140 can include one or more of the following mechanisms: a keyboard; a scanner; a user pointing device such as, for example, a mouse, a trackball, or a touch pad. As illustrated in FIG. 1, the user input device 140 is connected to the processor 110. The user input device 140 may be connected to the processor 110 directly, through a local area network (LAN), through a wide area network (WAN) through a wired or wireless network, through the Internet, an intranet or an extranet.

The system 100 can also include a database 160 for storing the data that may be needed or desired in performing the method steps described in this document. The database can be a physically separate system coupled to the processor 110, as illustrated. In one version of the system 100, the processor 110 and the mass storage device 180 perform the functions of the database 160.

The system 100 can further include one or more output devices, for example, a display 150 and a printer 170. The output devices provide information, such as computational results, to the user. The one or more output devices may be located in a different location than the processor 110 and may be connected to the processor 110 directly or through a local area network (LAN), through a wide are network (WAN) through a wired or wireless network, through the Internet, an intranet or an extranet.

In one embodiment, the system 100 performs the steps of processes that assign value to patents and patent portfolios as a function of the difference between (1) the profits derived from the sales of the patented products, processes, and services under the patent monopoly; and (2) the profits derived from the same products, processes, and services in a hypothetical freely-competitive environment without patent protection. The profits may be net or gross profits. In another embodiment, the incremental annual value of the patent monopoly may be approximated as the difference between gross revenues obtained under the patent monopoly and the corresponding gross revenues obtained under the hypothetical conditions without patent protection.

Figure 2A:
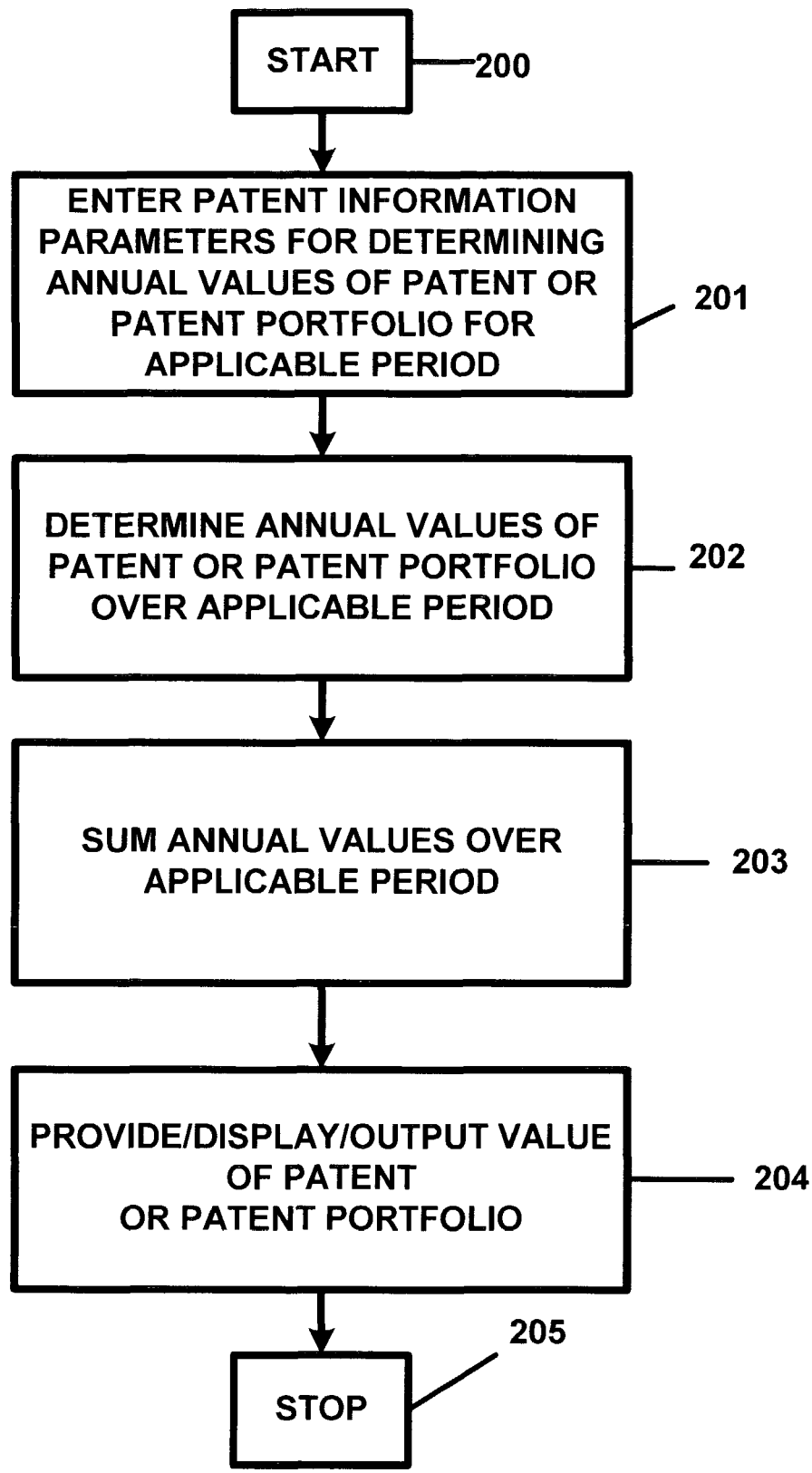
FIG. 2A illustrates a simplified flowchart of a method for computing an estimate of the total value of a patent portfolio, in accordance with the present invention.

FIG. 2A is a simplified flowchart diagram of one patent value estimation process in accordance with the present invention. The process, which can be used to assign a value to a patent or patent portfolio, starts at step 200. At step 201, the variables or assumptions relating to the determination of the patent value are set and provided to the patent valuation system, for example, the system 100 of FIG. 1. The nature of the variables and assumptions made will become apparent from the discussion of the individual steps below.

At step 202, the annual values $AV_i(P)$ of a patent (P) for years (i) of its statutory life (or another applicable period) are determined. In this computation, the annual value for a given year i is the difference between the profits $\langle PRFT \rangle_i$ derived from the sales of a patented product or service under the monopoly afforded by the patent, and the corresponding profits $PRFT_i$ in a freely-competitive environment without protection of the patents:

$$AV_i(P) = \langle PRFT \rangle_i - PRFT_i. \tag{1}$$

(Note that in the above formula and elsewhere in this document the angular brackets $\langle \ \rangle$ denote a parameter under the patent monopoly.)

Expanded, the formula appears like this:

$$AV_i(P) = (\langle PR \rangle_i - \langle CG \rangle_i) \times \langle S \rangle_i - (PR_i - CG_i) \times S_i, \tag{2}$$

where $\langle PR \rangle_i$ is the unit price of the patented product, service, or process (generically referred to as "goods" hereinafter) under monopolistic conditions in the given year i; $\langle CG \rangle_i$ is the cost of a unit of goods under the monopolistic conditions in the year i; $\langle S \rangle_i$ is the market share under the monopolistic conditions during the same year within the term of patent monopoly, expressed as the sales volume of the patented goods (e.g., units); and $PR_i$, $CG_i$, and $S_i$ are respectively the price, cost of goods sold, and the sales volume of the same goods in the same year i, but in a hypothetical freely-competitive environment without the benefit of the monopoly afforded by the patent. In assigning values to these variables, we can assume optimal pricing in each case, i.e., pricing that maximizes profits in both the case of patent monopoly and the case of a market without patent protection. Such optimal prices may be determined by analyzing the demand curve for the goods with and without patent protection. Alternative pricing assumptions can, of course, be made as well.

The computation of step 203 produces the total value of the patent over its expected life. This is accomplished by summing the annual results produced in step 202 over the applicable period, i.e., the period over which valuation estimate is sought:

$$V(P) = \sum_{i=1}^{l} (\langle PRFT \rangle_i - PRFT_i) \tag{3}$$

or $$V(P) = \sum_{i=1}^{l} [(\langle PR \rangle_i - \langle CG \rangle_i) \times \langle S \rangle_i - (PR_i - CG_i) \times S_i], \tag{4}$$

where $\langle PR \rangle_i$, $\langle CG \rangle_i$, $\langle S \rangle_i$, $PR_i$, $CG_i$, and $S_i$ are values as in expressions (1) and (2) above, and $V(P)$ is the total value the patent is expected to produce over the applicable period of l years. In other words, the total patent value is the sum of the incremental values of the patent monopoly on an annual basis over the applicable period of computation. Such applicable period may by the remaining statutory life of the patent (i.e. number of years left until the patent's expiration), the remaining expected economic life of the goods or any other applicable period. The periods for which the incremental value of the patent monopoly is computed and then summed may be annual periods, monthly periods (to account for the fact that the patent may issue and expire in expire in any months of the year) or any other applicable periods, Using a slightly different notation, the total value of the patent is computed as follows:

$$V(P) = \sum_{i=1}^{l} \Delta_i, \tag{5}$$

where $\Delta_i$ is the incremental value of patent monopoly in year i, that is:

$$\Delta_i = \langle PRFT \rangle_i - PRFT_i \tag{6}$$

or $$\Delta_i = (\langle PR \rangle_i - \langle CG \rangle_i) \times \langle S \rangle_i - (PR_i - CG_i) \times S_i \tag{7}$$

Typically, the applicable period begins with the current year or the year of a proposed transaction, and ends with the year of the patent's expiration, or the estimated year when the value of the patented technology vanishes. Technological obsolescence, changing tastes, and other factors may shorten the useful life of the goods. The average economic life of a new product (before the underlying technology becomes obsolete) is only about five years. In this case, the summations of formulas (3) and (4) may have fewer terms than years left in the statutory life of the patent, as the sales volume eventually dwindles to zero. Nevertheless, for licensing purposes, the patent is enforceable during its entire term, and as long as patent claims can be read on available goods, licensing royalties may be due and the patent may have value beyond the economic life of the underlying technology. In this case, we can modify the above expressions by including licensing revenues in the term $\langle PRFT \rangle_i$. The applicable period of course can also be terminated by events other than patent expiration or obsolescence: for example, a patent may be invalidated by court before its term expires, or a corporate restructuring may be contemplated sooner than the date of the patent expiration.

The annual incremental values $\Delta_i$ may change over the life of the patent. Such changes may result, for example, from product promotion, change in the cost of goods used for the manufacture of the product, the availability and cost of substitute products, and general economic conditions. All such factors may be taken into account when forecasting present values by the expressions given above for V(P).

The result of the computation of step 203 is then displayed (or otherwise outputted) in step 204. The result ca also be stored or transmitted to another system. In step 203, the result may be transmitted over the Internet or another network before being displayed or otherwise outputted.

Figure 2B:
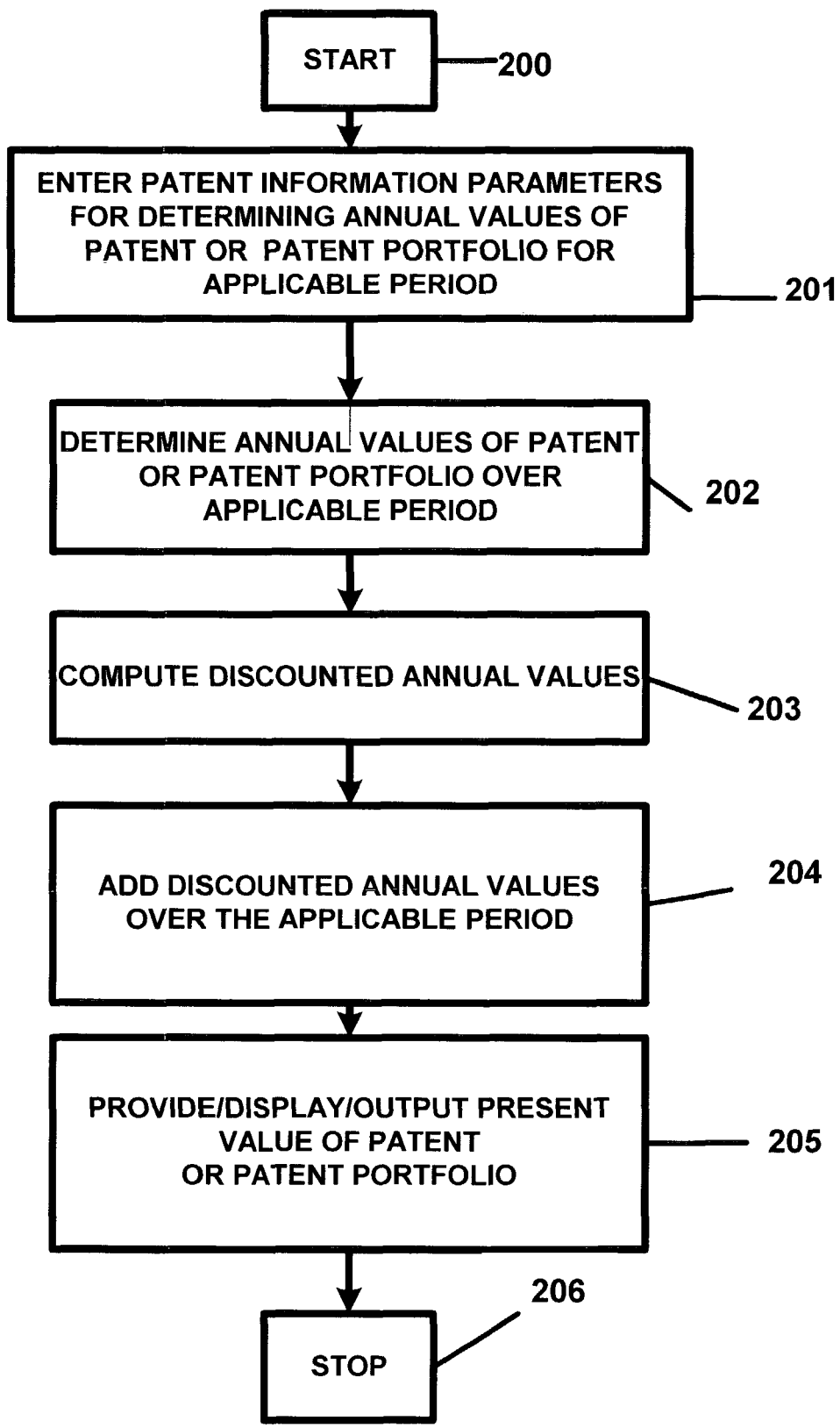
FIG. 2B illustrates a simplified flowchart of a method for computing an estimate of the present value of a patent portfolio, in accordance with the present invention.

Note that the result computed in the process illustrated in FIG. 2A is the total value produced by the patent over a period, i.e., the sum of the incremental profits attributable to the patent monopoly. In the real world, some nonzero interest or discount rate is generally assumed for financial transactions, i.e., it is the present value that matters for decision-making purposes. FIG. 2B illustrates a simplified flowchart of a process for assigning a present value estimate to a patent.

Steps 200, 201, and 202 of the flowchart in FIG. 2B are similar to the identically-numbered steps of the flowchart in FIG. 2A. Note, however, that the parameters provided in step 201 now include the applicable discount rate I or rates $I_i$.

In step 203 each of the annual values is discounted, based on the year and the discount rate:

$$AVD_i(P) = \frac{\Delta_i}{(1+I_i)^i}. \tag{8}$$

In the latest expression, $AVD_i(P)$ stands for the discounted present value brought by the patent in the ith year.

The present value is computed by summing the discounted annual values in step 204. These are the computational formulas:

$$PV(P) = \sum_{i=1}^{l} \frac{\Delta_i}{(1+I_i)^i}, \text{ or} \tag{9}$$

$$PV(P) = \sum_{i=1}^{l} \frac{\langle PRFT \rangle_i - PRFT_i}{(1+I_i)^i} \tag{10}$$

or $$PV(P) = \sum_{i=1}^{l} \frac{(\langle PR \rangle_i - \langle CG \rangle_i) \times \langle S \rangle_i - (PR_i - CG_i) \times S_i}{(1+I_i)^i}. \tag{11}$$

In the preceding three expressions, $I_i$ is the discount interest rate for the year i. This discount rate may reflect not only the cost of money and the traditional uncertainties associated with the forecast of future revenues, but also the risk of potential patent infringement that may threaten the patent in the future—if the patent is invalidated or is not enforced, the incremental value of the patent monopoly may vanish. This can merit an increase in the applicable discount rate.

In step 205, the result for the present value is displayed or otherwise outputted. The result may also be stored, e.g., in the database 160, or transmitted to another system. In step 205, the result may be transmitted over the Internet or another network before being displayed or otherwise outputted.

In a simplified case similar to an ordinary annuity, where the incremental annual value of the patent monopoly $\Delta_i$ and the annual discount rate $I_i$ remain constant ($\Delta_i=\Delta$ and $I_i=I$) throughout the applicable period, expression (9) can be written as $$PV(P) = \Delta\left[\frac{1-\left[\frac{1}{(1+I)^l}\right]}{I}\right]. \tag{12}$$

To work out a simple numerical example, let us assume that a patent that secures a limited monopoly yields a constant incremental annual value of $\Delta$, has a remaining life of seventeen years (l=17), and the applicable discount rate is twenty-five percent (I=0.25). The present value of this patent becomes $$PV(P) = \Delta\left[\frac{1-\left[\frac{1}{(1+0.25)^{17}}\right]}{0.25}\right] = 3.9\Delta.$$

For $\Delta=\$1,000,000$, I=25% and l=17 years, the present value of the patent is $3,909,928. In general, interest rates between about 10% and about 50% are appropriate for patent valuation, and it is a good rule of thumb to multiply the constant incremental annual value of a patent monopoly by about 3.9 to obtain an estimate of the value of the patent or portfolio. Or, for every additional million dollars in the incremental annual value of patent monopoly, the overall patent value increases by approximately four (or, more precisely, 3.9) million dollars.

The above expressions have been derived under the assumption that the patented product is protected by one patent. Nevertheless, similar expressions also describe the value of a patent portfolio protecting patented goods, regardless of the number of patents in the portfolio. Simply put, the value of the patent portfolio protecting a market monopoly can often be determined by the annual incremental values of this monopoly, appropriately discounted, regardless of the number of patents in the portfolio. This notion reflects the fact that two or more patents afford their owner at least the same degree of exclusivity as a single patent that protects the same product, service, or process. The principles of the present invention can therefore be used to estimate total and present values of a patent portfolio.

For completeness, here are the expressions for determining the total value V(PP) of a patent portfolio PP:

$$V(PP) = \sum_{i=1}^{l} (\langle PRFT \rangle_i - PRFT_i), \text{ or} \tag{13}$$

$$V(PP) = \sum_{i=1}^{l} [(\langle PR \rangle_i - \langle CG \rangle_i) \times \langle S \rangle_i - (PR_i - CG_i) \times S_i], \text{ or} \tag{14}$$

$$V(PP) = \sum_{i=1}^{l} \Delta_i. \quad (15)$$

The analytical expressions for determining the present value PV(PP) of a patent portfolio PP also parallel those for determining the present value of a single patent. Initially, the annual value $AV_i(PP)$ for each of the l years of the portfolio's life (or another applicable period) is computed as the difference between the profits brought by the sales of the goods under the conditions of monopoly, and the profits in the absence of the monopoly:

$$AV_i(PP) = \langle PRFT \rangle_i - PRFT_i. \quad (16)$$

In our alternative notation, this expression becomes $$AV_i(PP) = \Delta_i \quad (17)$$

Next, the annual values are discounted to obtain $AVD_i(PP)$, the annual present values for the years of the applicable period:

$$AVD_i(PP) = \frac{\Delta_i}{(1+I_i)^i}. \quad (18)$$

The present value PV(PP) of the portfolio is then obtained as the sum of the discounted present values of incremental annual components, as follows:

$$PV(PP) = \sum_{i=1}^{l} \frac{(\langle PRFT_i \rangle - PRFT_i)}{(1+I_i)^i}, \text{ or} \quad (19)$$

$$PV(PP) = \sum_{i=1}^{l} \frac{[(\langle PR \rangle_i - \langle CG \rangle_i) \times \langle S \rangle_i - (PR_i - CG_i) \times S_i]}{(1+I_i)^i}, \text{ or} \quad (20)$$

$$PV(PP) = \sum_{i=1}^{l} \frac{\Delta_i}{(1+I_i)^i}. \quad (21)$$

Similarly to the case of a single patent, the discount interest rate $I_i$ applied to the projected income stream may reflect the returns available on safer investments, and the additional business risks associated with the portfolio, such as the risk of infringement and the uncertainties of patent infringement litigation.

The similarity of expressions for the patent valuation and patent portfolio valuation cases shows that the processes of FIGS. 2A and 2B apply to the latter case as well.

The processes and expressions described above work well in the paradigm where competitors respect the intellectual property rights of each other and do not infringe each other's patents. In the real world, where patent infringement is a commonplace reality, patent monopoly is often challenged by an infringing competitor and has to be enforced in court. The uncertainties of litigation can be reflected in choosing a higher discount rate to calculate the present value estimate of a patent or patent portfolio in accordance with expressions (1) through (21) on an ad hoc basis. But these uncertainties can be handled in a more objective, rigorous, and precise manner by using additional principles of the present invention, as described below. Furthermore, in certain instances it is difficult to forecast accurately the parameters affecting the computation of the value estimate of a patent. In such cases, it may be useful at least to ascertain the range of numbers that represent the minimum and maximum values of the patent. For these reasons, we turn to the processes for determining, assigning, or estimating value of patents and patent portfolios under real world conditions.

Many inventions can be designed around. By this I mean that an alternative solution to the problem solved by the patented technology can be found, and that the solution will not infringe the patent or portfolio protecting the technology. The cost of such alternative solution, if the solution is successful, effectively places an upper limit on the value of the patent or portfolio. Indeed, any potential patent buyer or licensee faces a dilemma: (1) to buy or license a patent, or (2) to attempt to design around the patent. Because an attempt to design around carries with it the twin possibilities of failure and cost overruns, the cost of the design around attempt ($C_{da}$), probability of failure ($P_{fa}$), and the cost overrun factor ($P_{co}$) affect the upper limit imposed by the possibility of design around efforts. Furthermore, even if the design around efforts are successful, the owner of the patent or portfolio may still enjoy the first mover advantage, i.e., the opportunity to act first and affect the outcome of the competitive process. We will denote the value of the first mover advantage as FMA.

Given all these factors, the maximum value of a patent or portfolio can be derived from the next equation:

$$\max(PV) = FMA + C_{da} \times (1 + P_{co}) + P_f \times CNEL, \quad (22)$$

with CNEL denoting the cost of a non-exclusive license. Because the cost of a non-exclusive license should not exceed the value of the patent, we assume the worst case scenario—non-exclusive license is unavailable—and substitute the maximum value of the patent for CNEL. The above equation then takes this form:

$$\max(PV) = FMA + C_{da} \times (1 + P_{co}) + P_f \times \max(PV). \quad (23)$$

Solving this equation for max(PV), we obtain the following result:

$$\max(PV) = \frac{C_{da} \times (1 + P_{co}) + FMA}{(1 - P_f)}. \quad (24)$$

Note that in this equation, the cost overrun factor $P_{co}$ reflects both the probabilities of various overruns and their magnitudes. In one exemplary process, $P_{co}$ is the statistical expectation of cost overruns.

We now proceed to estimate the minimum value of a patent or patent portfolio. The minimum value of a patent can be gauged from two factors. First, when a patent application is initially filed, a calculated decision has (or should have) been made to exchange the value of the trade secret related to the invention for the value of the future patent protection. At the very least, a patent should be worth as much as the related trade secret.

Second, the monopoly or other advantage afforded by the trade secret is limited by the economic life of the underlying invention, which is usually shorter than the statutory life of a patent. The advantage is further limited by the possibility that a competitor will discover the trade secret adventitiously or by reverse engineering the product containing the trade secret. This factor can limit the value of the trade secret to the first mover advantage. Consequently, in one method in accordance with the present invention, the minimum value min (PV) of a patent or portfolio is estimated as equal to the value of the trade secrets disclosed in the patent application(s). In another method in accordance with the present invention, the minimum value of the patent or portfolio is estimated as the value of the first mover advantage. Using the third method in accordance with the present invention, the minimum value of a patent or portfolio is estimated as the lower of the two values, i.e., the value of the trade secrets and the value of the first mover advantage.

Figure 3:
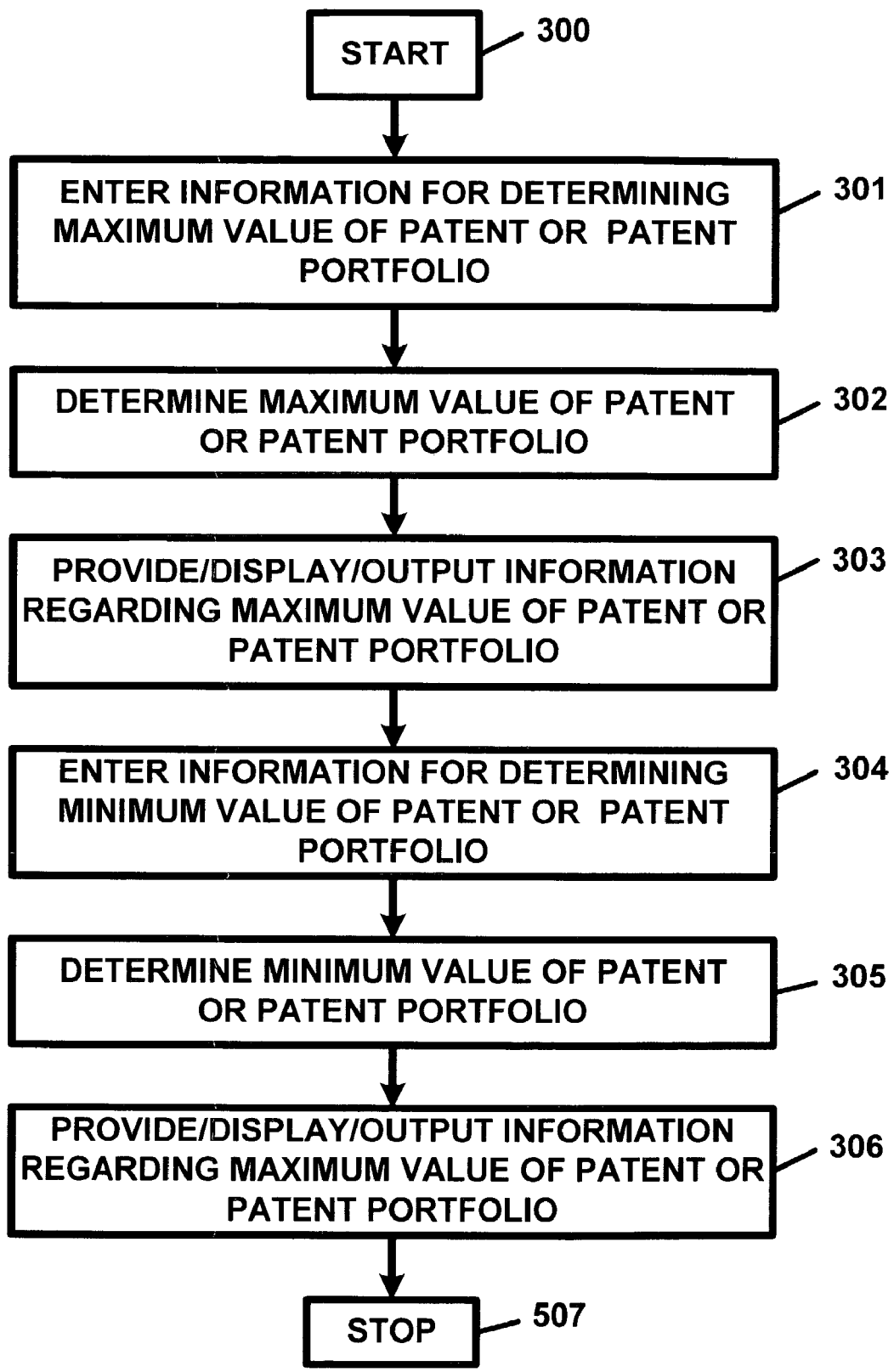
FIG. 3 illustrates a simplified flowchart of a method for computing minimum and maximum value estimates of a patent portfolio, in accordance with the present invention.

The system 100 can calculate the maximum and minimum values of the patent or patent portfolio from the information entered by the user, stored internally, in the database 160, or otherwise made available to the system. The computed maximum and minimum values can then be provided to the user, for example, via the display device 150 or the output device 170 or served to the user via the Internet. The values can also be stored for future use. The flowchart of FIG. 3 illustrates the steps of the process for computing the maximum and minimum values of a patent or patent portfolio, in a simplified manner. Step descriptions in the flowchart are self-explanatory.

Recall that the estimate of the present value of a patent portfolio was described by these expressions, derived above:

$$PV(PP) = \sum_{i=1}^{t} \frac{(\langle PRFT_i \rangle - PRFT_i)}{(1+I_i)^i}, \text{ or} \qquad (19)$$

$$PV(PP) = \sum_{i=1}^{t} \frac{[(\langle PR \rangle_i - \langle CG \rangle_i) \times \langle S \rangle_i - (PR_i - CG_i) \times S_i]}{(1+I_i)^i}, \text{ or} \qquad (20)$$

$$PV(PP) = \sum_{i=1}^{t} \frac{\Delta_i}{(1+I_i)^i}. \qquad (21)$$

The expressions are analytically accurate, but they do not reflect the real world problem of patent infringement. Infringement, however, is commonplace, and the value of the patent or patent portfolio can be corrected for its possibility. As noted above, we can of course use a higher discount rate in expressions (19)-(21) on an ad hoc basis, to reflect potential infringement. Alternatively, we can account for the vicissitudes of real world in a more rigorous manner. In doing so, we focus on three related factors: (1) the probability $G_i$ (a k a $P_i$ in the appended claims) that patent rights will be infringed, (2) the probability E that the patent owner will enforce the patent rights in the event of infringement, and (3) the probability F that the patent owner will prevail in court.

Assuming that the three probabilities $G_i$, E, and F are statistically independent, the universe of present value outcomes can be divided into two sets. The first set of outcomes is when the patent rights are not infringed. It has the probability of $(1-G_i)$ associated with it, and the present value need not be adjusted for either E or F, because neither the patent owner's willingness to enforce the patent rights nor its ability to enforce the rights affects the financial results. The second set of outcomes is when the patent rights are indeed infringed. The probability of this set of outcomes is $G_i$ by definition. In this latter case, the financial results are directly affected by the probabilities E and F. The probabilities $G_i$, E, and F can therefore be combined into an adjustment factor $((1-G_i)+G_i \times E \times F)=(1-G_i \times (1-E \times F))$ for multiplying the previously obtained value estimates.

With this in mind, the expressions (19)-(21) can now be rewritten to provide equations for determining the adjusted present value AdjPV(PP) of patent rights:

$$AdjPV(PP) = [1 - G_i \times (1 - E \times F)] \times \sum_{i=1}^{t} \frac{(\langle PRFT_i \rangle - PRFT_i)}{(1+I_i)^i}, \qquad (25)$$

$$AdjPV(PP) = [1 - G_i \times (1 - E \times F)] \times \qquad (26)$$
$$\sum_{i=1}^{t} \frac{[(\langle PR \rangle_i - \langle CG \rangle_i) \times \langle S \rangle_i - (PR_i - CG_i) \times S_i]}{(1+I_i)^i}, \text{ and}$$

$$AdjPV(PP) = [1 - G_i \times (1 - E \times F)] \times \sum_{i=1}^{t} \frac{\Delta_i}{(1+I_i)^i}. \qquad (27)$$

The probability E that the patent owner will enforce the patents depends mainly on two factors: (1) the owner's willingness to do so, herein termed as $E_w$; and (2) the owner's financial ability to do so, herein termed as $E_a$. For example, a patent owned by a hypothetical Japanese corporation that is known not to enforce its patents is worth (to the owner) less than a similar patent owned by a hypothetical US corporation that is known to enforce its patents vigorously. Likewise, a patent owned by an individual without the financial ability to bankroll expensive patent infringement litigation is worth less than a similar patent owned by a well financed corporation having sufficient resources to enforce its patent.

In accordance with the principles of the present invention, these factors of willingness $E_w$ and ability $E_a$ may be taken into account when estimating the probability of patent enforcement E. If these two factors are independent, the total probability of enforcement E is the product of these two factors:

$$E = Ew \times Ea. \qquad (28)$$

When the patent owner is absolutely determined to enforce the patent rights, $E_w=1$. Similarly, when an infringement abatement insurance policy, which pays for the litigation expenses in the even of infringement, has been purchased, $E_a=1$.

The probability F of prevailing at trial is also a product of several factors, which include: (a) the probabilities $F_i$ that a particular patent will be found infringed; (b) the probability $F_v$ that the patent will be found not invalid (for simplicity, we will avoid the double negative and use the more convenient albeit less precise valid hereinafter); and (c) the probability $F_e$ that the patent will not be found unenforceable (we will once again dispense with the double negative and use enforceable hereinafter).

Historically, the probability $F_i$ that a given patent will be found infringed is about sixty-six percent (66%). The probability $F_v$ that a given patent will be found valid is about sixty-seven percent (67%). And the probability $F_e$ that a given patent will be found enforceable is about eighty-eight percent (88%). Strictly speaking, these probabilities are not statistically independent, as historical data show that judges rule in favor of the same party on all issues in 74 percent of cases, and juries in 86 percent of cases. See Samson Vermont, "Business Risk Analysis: The Economics of Patent Litigation," in *From Ideas to Assets: Investing Wisely in Intellectual Property* (Bruce Berman, ed, John Wiley & Sons, Inc., New York). But, in some of the derivations to follow, we will assume that the probabilities are independent.

Assuming the statistical independence of $F_i$, $F_v$, and $F_e$, the probability that a particular patent $P^j$ will be found (1) valid, (2) infringed, and (3) enforceable, is the product of these three probabilities:

$$P^j = F_v^j \times F_i^j \times F_e^j. \tag{29}$$

Consequently, the probability $G^j$ that the same patent will not be found valid, infringed, and enforceable is $$G^j = 1 - P^j \equiv 1 - F_v^j \times F_i^j \times F_e^j. \tag{30}$$

Assuming that the probabilities $P^j$ are statistically independent for different patents, the probability $G_{portfolio}$ that none of the patents in the portfolio of n patents will be found valid, infringed, and enforceable (all three), is described by this expression:

$$G_{portfolio} = \prod_{j=1}^{n} (1 - F_v^j \times F_i^j \times F_e^j) \text{ (}\Pi\text{ denotes multiplication).} \tag{31}$$

It follows then that the probability $F_{portfolio}$ that at least one patent in the portfolio will be found valid, infringed, and enforceable is $$F_{portfolio} = 1 - G_{portfolio} \equiv 1 - \prod_{j=1}^{n} (1 - F_v^j \times F_i^j \times F_e^j). \tag{32}$$

Substituting the above expression into expressions (25)-(27), we get the following expressions for the present value computation:

$$AdjPV(PP) \equiv \left(1 - P_i \times \left(1 - E \times \left(1 - \prod_{j=1}^{n}(1 - F_v^j \times F_i^j \times F_e^j)\right)\right)\right) \times \tag{33}$$
$$\sum_{i=1}^{t} \frac{(\langle PRFT_i \rangle - PRFT_i)}{(1+I_i)^i},$$

$$AdjPV(PP) = \left(1 - P_i \times \left(1 - E \times \left(1 - \prod_{j=1}^{n}(1 - F_v^j \times F_i^j \times F_e^j)\right)\right)\right) \times \tag{34}$$
$$\sum_{i=1}^{t} \frac{[(\langle PR \rangle_i - \langle CG \rangle_i) \times \langle S \rangle_i - (PR_i - CG_i) \times S_i]}{(1+I_i)^i}, \text{ and}$$

$$AdjPV(PP) = \tag{35}$$
$$\left(1 - P_i \times \left(1 - E \times \left(1 - \prod_{j=1}^{n}(1 - F_v^j \times F_i^j \times F_e^j)\right)\right)\right) \times \sum_{i=1}^{t} \frac{\Delta_i}{(1+I_i)^i}.$$

If we assume that the individual probabilities are the same for all patents ($F_v^j = F_v$, $F_i^j = F_i$, and $F_e^j = F_e$ for all j) in the portfolio, the expression (32) reduces to $$F_{portfolio} = 1 - (1 - F_v \times F_i \times F_e)^n. \tag{36}$$

Substituting this expression into expressions (25)-(27), we get these results:

$$AdjPV(PP) = (1 - P_i \times (1 - E \times (1 - (1 - F_v \times F_i \times F_e)^n))) \times \tag{37}$$
$$\sum_{i=1}^{t} \frac{(\langle PRFT_i \rangle - PRFT_i)}{(1+I_i)^i},$$

$$AdjPV(PP) = (1 - P_i \times (1 - E \times (1 - (1 - F_v \times F_i \times F_e)^n))) \times \tag{38}$$
$$\sum_{i=1}^{t} \frac{[(\langle PR \rangle_i - \langle CG \rangle_i) \times \langle S \rangle_i - (PR_i - CG_i) \times S_i]}{(1+I_i)^i}, \text{ and}$$

$$AdjPV(PP) = \tag{39}$$
$$(1 - P_i \times (1 - E \times (1 - (1 - F_v \times F_i \times F_e)^n))) \times \sum_{i=1}^{t} \frac{\Delta_i}{(1+I_i)^i}.$$

Some of the individual probability parameters can often be adjusted to reflect the specific circumstances of particular patents. For example, the probabilities of validity $F_v$ and of enforceability $F_e$ of a patent that has emerged relatively unscathed from reexamination proceedings in the Patent & Trademark Office can be adjusted upwards to reflect this event. Similarly, these probabilities should also be adjusted upwards for a patent that has successfully withstood previous litigation.

The above expressions can be further simplified by using historical data showing that patentees prevail in approximately fifty-eight percent (58%) of cases. More specifically, patentees prevail in approximately fifty-one percent (51%) of bench trials and in sixty-eight percent (68%) of jury trials. Since the plaintiff always has the option to demand jury trial, it is reasonable to assume the higher probability of 68% to be able to prevail at trial. Inserting this probability into expression (39) yields:

$$AdjPV(PP) = (1 - P_i \times (1 - E \times 0.68)) \times \sum_{i=1}^{t} \frac{\Delta_i}{(1+I_i)^i}. \tag{40}$$

Expression (33)-(40) provide reasonably good estimates of the patent portfolio value in general, based on the assumption that no infringement is known at the time the estimates are made.

The risk of infringement can be effectively managed by purchasing patent insurance policies. These come in at least two major varieties: (1) patent validity policies that pay if the insured patent is invalidated; and (2) infringement abatement policies that pay for litigation expenses in the event the insured patent is infringed. Both kinds of policies have been available from various insurance companies. The availability of these policies allows us to simplify the valuation analysis further.

First, we assume that the owner of patents covered by infringement abatement policies is determined to enforce the patents. Thus, $E_w=1$. Moreover, we eliminate the probability factor $E_a$ associated with the ability of the owner to enforce the patents and, instead, subtract the cost of the infringement abatement policies from the estimated value of the portfolio. We can further eliminate the probabilities that the patent will be found valid $F_v$ and enforceable $F_e$ from the analysis, and instead subtract the cost of the patent validity insurance from the estimate of the portfolio's value. Finally, we assume that the probability of finding infringement $F_i$ is about 0.66; as mentioned earlier, this figure is borne out by statistical studies. Incorporating these assumptions into our previous results yields this expression:

$$AdjPV(PP) = (1 - P_i \times (1 - 0.66)) \times \sum_{i=1}^{t} \frac{\Delta_i}{(1+I_i)^i} - A - B = \quad (41)$$

$$(1 - 0.34 P_i) \times \sum_{i=1}^{t} \frac{\Delta_i}{(1+I_i)^i} - A - B,$$

where A denotes the cost of the patent validity insurance, and B denotes the cost of the infringement abatement insurance.

A patent validity policy or an infringement abatement policy insures only the patent for which it is purchased. For expression (41) to be valid, all patents in the portfolio should be insured. Assuming that $A_j$ is the cost of the validity policy and $B_j$ is the cost of the infringement abatement policy for the patent $P_j$, the net present value estimate of a patent portfolio is $$AdjPV(PP) = (1 - 0.34 P_i) \times \sum_{i=1}^{t} \frac{\Delta_i}{(1+I_i)^i} - \sum_{j=1}^{n} (A^j + B^j). \quad (42)$$

Discounting the annual policy premiums $A_i^j$ and $B_i^j$ for each policy to present value, expression (42) becomes $$AdjPV(PP) = \sum_{i=1}^{t} \left[ \frac{(1 - 0.34 P_i) \times \Delta_i - \sum_{j=1}^{n} (A_i^j + B_i^j)}{(1+I_i)^i} \right]. \quad (43)$$

Although in the above expression the insurance premiums are discounted to present value using the same interest rates as are used for discounting the incremental profits $\Delta_i$, the discount rates may differ in some processes in accordance with the present invention.

The factor of about 0.66 or 66% in the above equations is empirical, derived from statistical observations. It is important to note that the invention is not limited to this probability factor of 66%. In every particular case all of the risk factors and other uncertainties can be evaluated using a decision tree analysis, Monte Carlo simulation, or a number of other tools and methods to arrive at the overall probability of success. Denoting by ps the probability of prevailing in a patent infringement litigation, we re-write the last equation in a more general form:

$$AdjPV(PP) = \sum_{i=1}^{t} \left[ \frac{(1 - P_i \times (1 - ps)) \times \Delta_i - \sum_{j=1}^{n} (A_i^j + B_i^j)}{(1+I_i)^i} \right]. \quad (44)$$

Let us now estimate the yield, or internal rate of return (IRR), of a patent portfolio, which is the interest rate y on a principal investment p that produces annual returns of $C_i$ for years 1 through n. The equation below relates these parameters to each other:

$$p = \sum_{i=1}^{n} \frac{C_i}{(1+y)^i}. \quad (45)$$

The equation can be solved for y through an iterative numerical process.

Figure 4A:
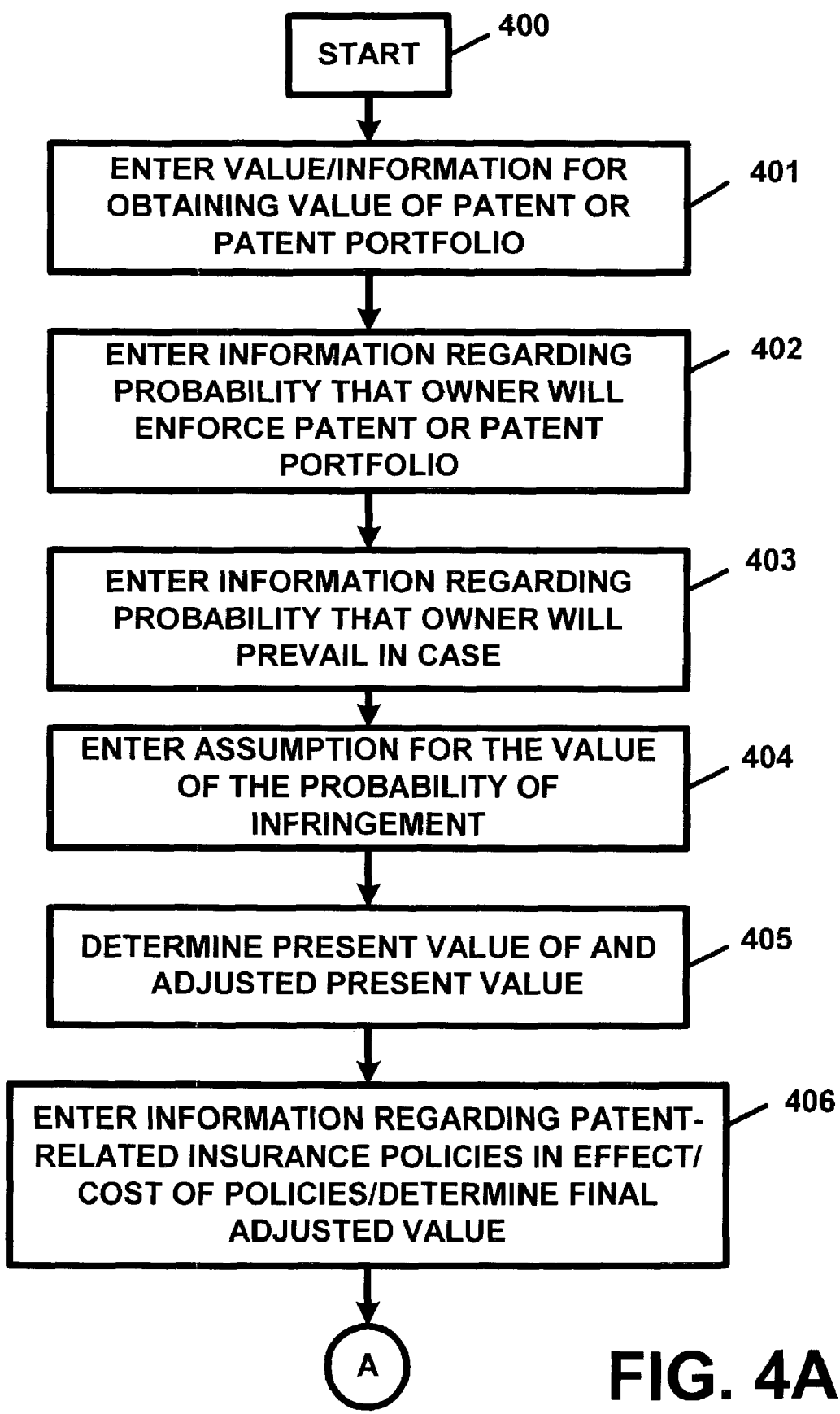
FIGS. 4A and 4B illustrate a simplified flowchart of a method for computing an estimate of risk-adjusted present value of a patent portfolio, in accordance with the present invention.
Figure 4B:
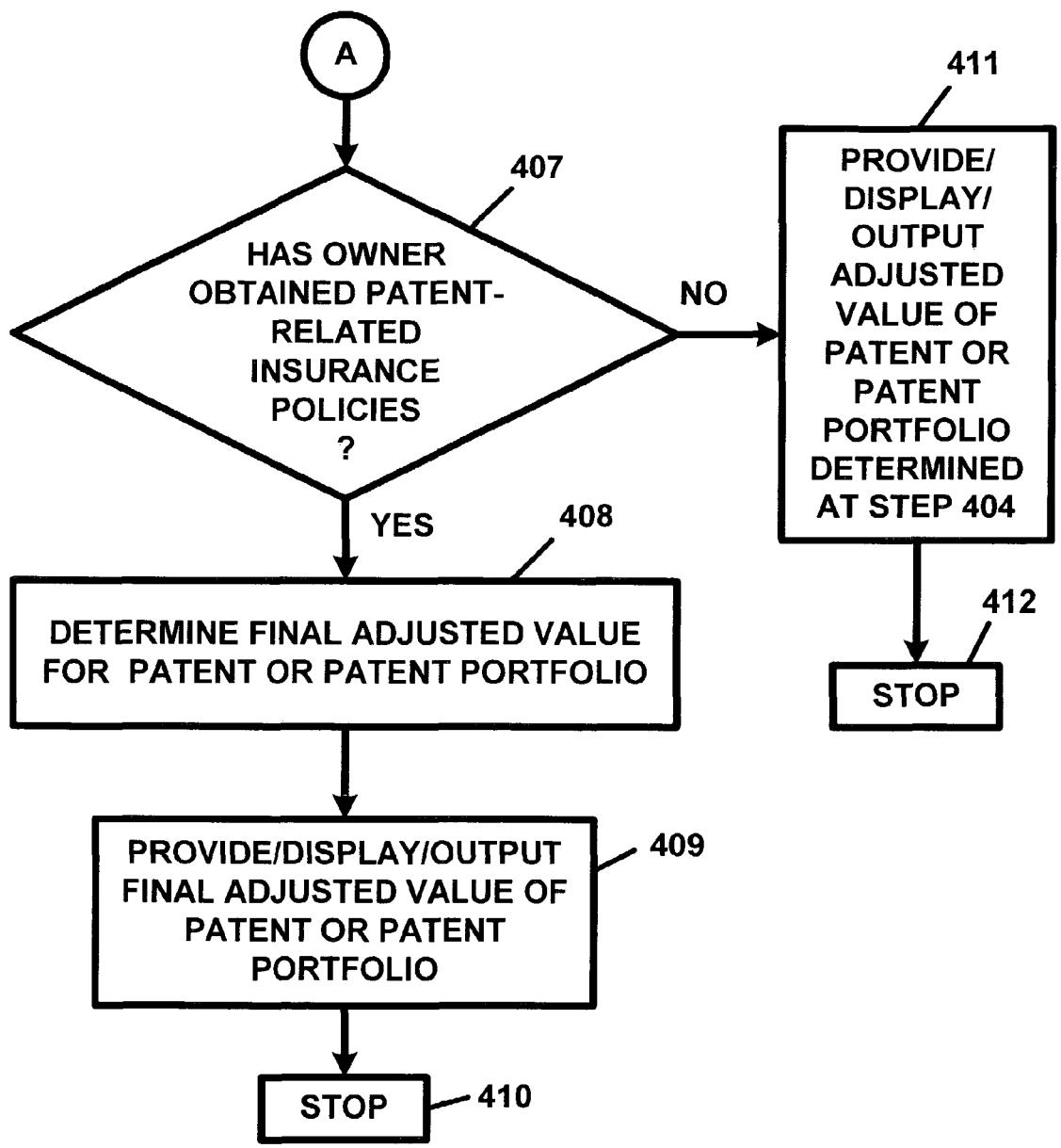

FIGS. 4A and 4B illustrate a simplified flowchart diagram of steps performed to estimate the adjusted present value of a portfolio. Economic data are provided to the system that performs the data processing steps, such as system 100 of FIG. 1 at step 401. The economic data may include the assumptions regarding the discount rate, and the annual sales volumes and profit margins under the conditions of patent monopoly and the hypothetical free market competition for the time of the applicable period. At step 402, the system is provided with the information bearing on the probability that the owner will enforce the portfolio. At step 403, the assumptions regarding the probabilities of the owner's prevailing against infringers are provided to the system. These assumptions may include the assumed probabilities that the patents of the portfolio will be found valid, infringed, and enforceable. At step 404, assumptions regarding probability of infringement are provided to the system. The system computes both the present value estimate and the adjusted present value estimate of the portfolio at step 405, using the expressions derived above, such as expressions (21), (27), and (40). At step 406 the system receives information regarding the presence and costs of patent-related insurance.

If the portfolio is not insured, the system branches at step 407 and outputs the computed results in step 411. If the portfolio is insured, the system determines the final adjusted value at step 408. Note that the final adjusted value includes the insurance information; it can be computed, for example, using expressions (41) through (44).

The annual return $C_i$ is analogous to the annual value of the patent monopoly afforded by the patent portfolio. We can therefore use the previously obtained results for the annual value of a portfolio:

$$C_i = \quad (46)$$

$$\left( 1 - P_i \times \left( 1 - E \times \left( 1 - \prod_{j=1}^{n} (1 - F_v^j \times F_i^j \times F_e^j) \right) \right) \right) \times \Delta_i \text{ (in general)},$$

$$C_i = (1-P \times (1-E \times (1-(1-F_v \times F_i \times F_e)^n))) \times \Delta_i \ (F_i, F_v, F_e \text{ are the same), and} \quad (47)$$

$$C_i = (1 - 0.34 P_i) \times \Delta_i - \sum_{j=1}^{n} (A_i^j + B_i^j) \text{ (insurance in place, 66\% success probability)}. \quad (48)$$

The cost of a patent portfolio, p, includes the cost of preparing, filing, and prosecuting the applications, $p_p$; and the cost of maintenance fees, such as filing fees, issue fees, and the periodic maintenance fees, $p_m$. The true cost, however, should also account for the public disclosure of the invention(s). An undisclosed invention, if kept confidential, is a trade secret. And the value PV(TS) of this forfeited trade secret is the ultimate price paid for obtaining the patent(s). The cost of the patent or patent portfolio is the sum of the three terms:

$$P = PV(TS) + p_p + p_m. \quad (49)$$

Expression (45) now takes on this form:

$$PV(TS) + p_p + p_m = \sum_{i=1}^{n} \frac{C_i}{(1+y)^i}. \quad (50)$$

The interest rate y that satisfies this equation is the yield or the internal rate of return of the patent portfolio.

The typical cost of patent prosecution is between $5,000 and $19,000 per patent. Over the life of the patent, the filing, issue, and periodic maintenance fees are about $7,740 for so-called large entities, and about $3,870 for small entities. These numbers allow us to quantify the $p_p$ and $p_m$ terms.

Figure 5:
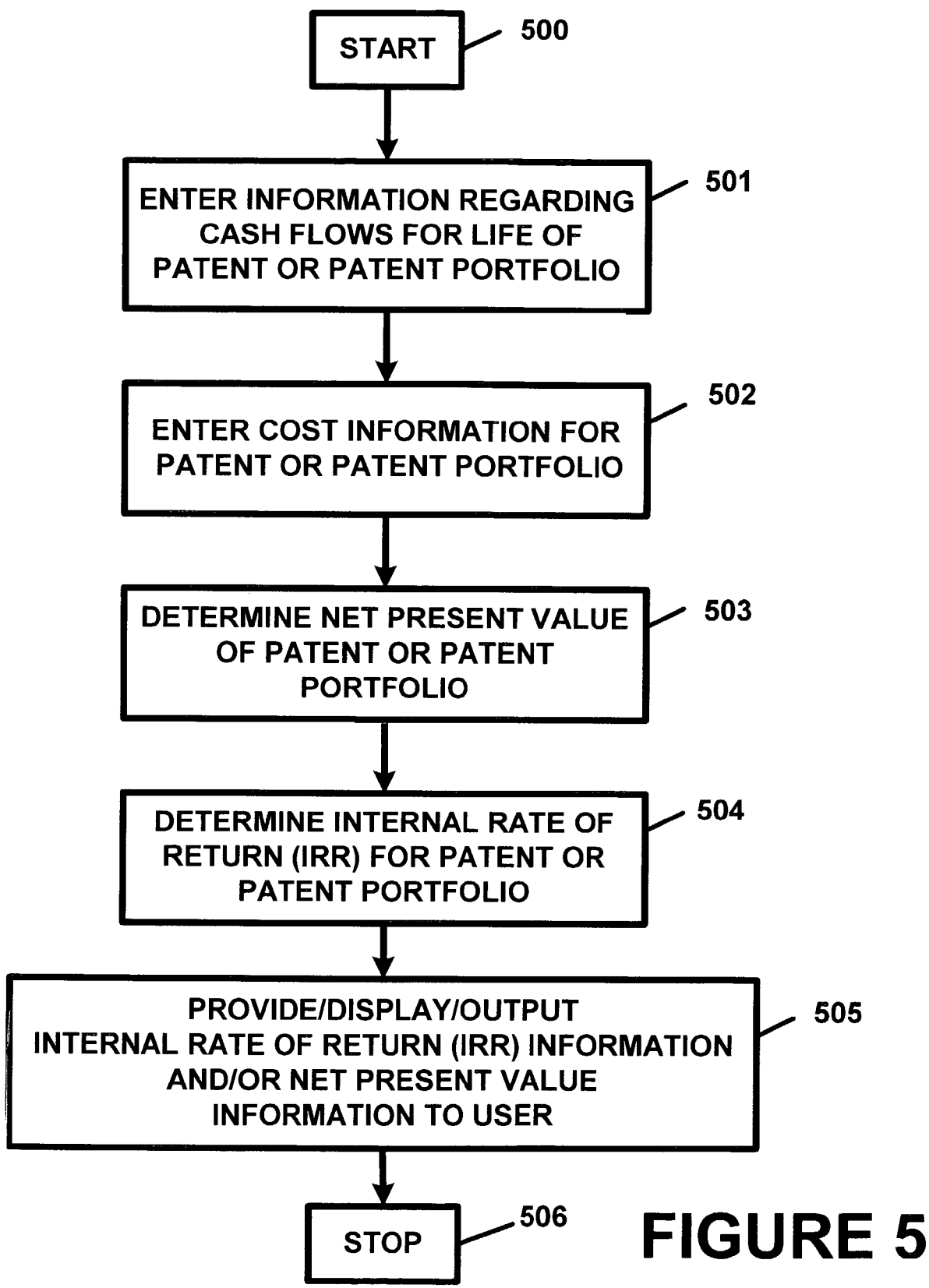
FIG. 5 illustrates a simplified flowchart of a method for computing estimates of the net present value and the internal rate of return of a patent portfolio, in accordance with the present invention.

FIG. 5 is a simplified flowchart diagram of the steps performed by a data processing system, such as the system 100, in computing the internal rate of return and net present value information. The data processing system receives the pertinent information and assumptions in steps 501 and 502, which information may include the prosecution and maintenance costs, the value of the trade secrets forfeited, and the economic assumptions about incremental annual value added by the portfolio. The system computes the net present value of the portfolio and the internal rate of return, at steps 503 and 504, respectively. The internal rate of return is computed from expression (50). The computed results are then outputted and/or stored at step 505.

When patent infringement occurs, the methodology developed can be further adjusted. In this event, a patent or patent portfolio may only be worth as much as one expects to recover in damages through litigation, less the cost of litigations plus the value of a permanent injunction, if granted. If the permanent injunction is granted, the patent monopoly is restored and can be valued according to the methods of the present invention already discussed. One needs to keep in mind, however, that, as a practical matter, less than 4% of filed patent infringement cases go to trial, and issuance of an injunction is less common when cases are resolved without a trial. Therefore, an injunction, although theoretically available by law as a remedy, is a rare occurrence.

If a permanent injunction is obtained in addition to the past damages PD, the value of the patent portfolio is $$AdjPV(PP) = PD - CL + \left(1 - P_i \times \left(1 - E \times \left(1 - \prod_{j=1}^{n}(1 - F_v^j \times F_i^j \times F_e^j)\right)\right)\right) \times \sum_{i=k}^{L} \frac{\Delta_i}{(1+I_i)^i}, \quad (51)$$

where the summation over i now starts with the year k in which the patent monopoly is restored (the prior years are addressed by the past damages PD), and CL is the cost of patent litigation necessary to enforce the patent.

The cost of litigation may be forecasted based on well-known statistics. According to a survey conducted by the American Intellectual Property Law Association (AIPLA) in the year 2000, the median cost of patent litigation in the U.S. is approximately two million dollars. Thus, the present value of the infringed patent portfolio may be estimated as $$AdjPV(PP) = \quad (52)$$
$$PD - \$2,000,000 + (1 - P_i \times (1 - E \times 0.68)) \times \sum_{i=k}^{L} \frac{\Delta_i}{(1+I_i)^i}.$$

The past damages PD can be of two kinds: (1) lost profits; and (2) reasonable royalties, where lost profits are not available or are lower than reasonable royalties, or where lost profits cannot be calculated with reasonable certainty. Lost profits are typically much larger than reasonable royalties. A careful analysis of the circumstances of the case in view of the then-available case law should be undertaken in order to ascertain the likelihood of obtaining lost profits. Generally, we can value the past damages according to this formula:

$$PD = Q \times LP + (1-Q) \times RR, \quad (53)$$

were Q is the probability of obtaining lost profits LP, and RR represents reasonable royalties. Thus calculated, past damages PD may then be used in the expressions (51) and (52).

Figure 6:
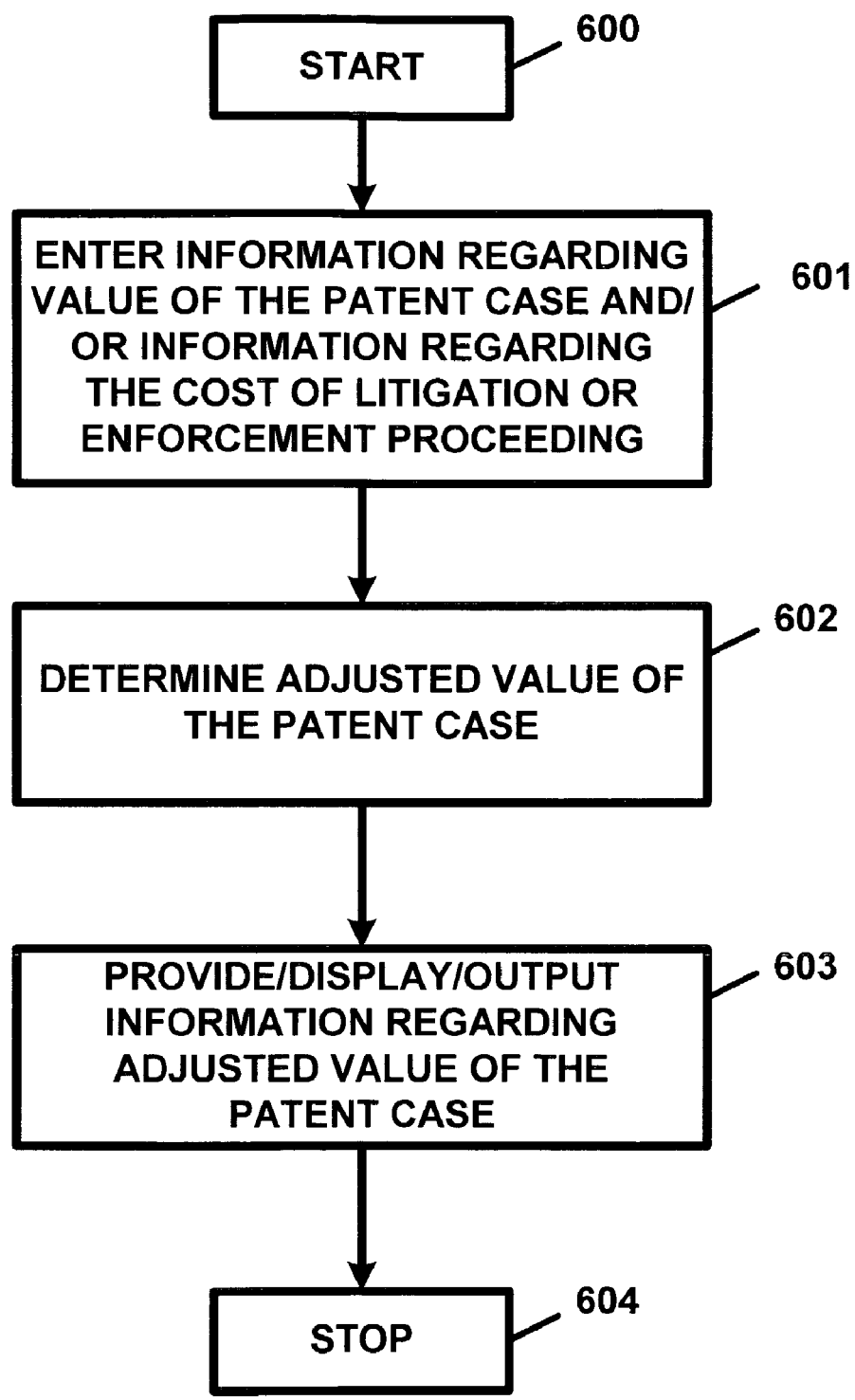
FIG. 6 illustrates a simplified flowchart of a method for computing an estimate of risk-adjusted present value of an infringed patent portfolio, in accordance with the present invention.

FIG. 6 shows the steps of a process for computing an estimated value of a litigated patent portfolio in accordance with the above discussion.

The value of a patent or patent portfolio to a licensee depends on whether the license is exclusive or not. A non-exclusive licensee only acquires a covenant not to sue for patent infringement. To determine the value of a non-exclusive license where there is no known infringement, we forecast the future sales of the licensed product and apply reasonable royalties to the sales. The discounted present value of such future royalties is the value of a non-exclusive license to the licensor. In this case, the discount rate should not only reflect the time value of money (i.e., cost of capital) and the uncertainties associated with the licensee's business, but also the uncertainty of a hypothetical litigation, which is avoided by the license grant.

An exclusive licensee not only acquires a covenant not to sue, but also the right to a patent monopoly, which the licensee can enforce against others. In this case, the expressions is obtained above produce the value estimates of such a patent or portfolio to the exclusive licensee. Note that the parameters used should now be related to the licensee.

A limited exclusive license, where the patent monopoly is limited, for example, to a certain industry, industry sector, or a geographical area, may be valued as a patent franchise using the methodology of the present invention. The value of such license is determined as an incremental value of a patent franchise, i.e., as the competitive advantage the franchise offers to the licensee within the competitive arena defined by the limitations of the license.

Figure 7:
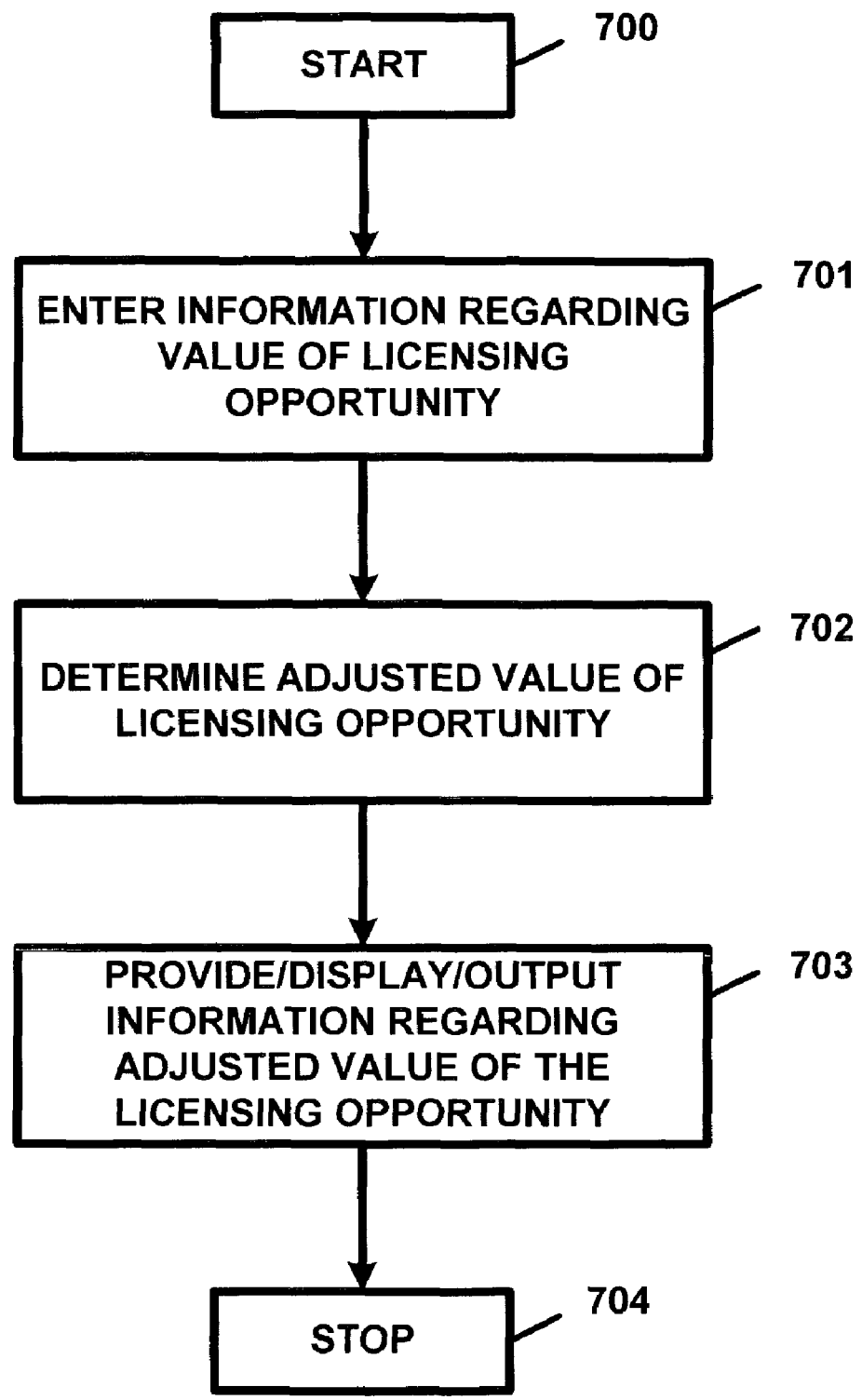
FIG. 7 illustrates a simplified flowchart of a method for computing an estimate of the risk-adjusted value of a licensing opportunity, in accordance with the present invention.

FIG. 7 illustrates a simplified flowchart of the steps for computing estimates of the adjusted present values of licensing opportunities in accordance with the discussion above.

Let us now turn to the issue of valuation of individual patents within an n-patent portfolio. One way to assign relative values to patents within the portfolio is on a pro rata basis:

$$V(P) \equiv \frac{1}{n} V(PP) = \frac{1}{n} \sum_{i=1}^{l} [((\langle PR \rangle_i - \langle CG \rangle_i) \times \langle S \rangle_i) - ((PR_i - CG_i) \times S_i)]. \quad (54)$$

In practice, however, the distinctions among the patents may be drawn upon better to refine the individual value estimates.

We first note that $$V(PP) = \sum_{j=1}^{n} V(P^j),$$

where the value of a portfolio of n patents is described as the sum of values of each individual patent $P^j$ in the portfolio. To account for the fact that the patents may be obtained and expire at different times, we consider the situation on an annual (or other periodic) basis, with the simplifying assumption that all patents are obtained on the first day of a year and they expire on the last day of a year. Thus, in any given year i the annual value of the patent monopoly, and therefore the annual value of the patent portfolio, is $$\sum_{j=1}^{n} V(P_i^j) = ((\langle PR \rangle_i - \langle CG \rangle_i) \times \langle S \rangle_i) - ((PR_i - CG_i) \times S_i). \quad (55)$$

The total value of the portfolio over its entire life is:

$$\sum_{i=1}^{l} \sum_{j=1}^{n} V(P_i^j) = \sum_{i=1}^{l} [((\langle PR \rangle_i - \langle CG \rangle_i) \times \langle S \rangle_i) - ((PR_i - CG_i) \times S_i)], \quad (56)$$

where l is the total number of years of the portfolio is active (or of another applicable period).

Since addition is a commutative operation, the last expression can be rewritten as $$\sum_{j=1}^{n} \sum_{i=1}^{l} V(P_i^j) = \sum_{i=1}^{l} [((\langle PR \rangle_i - \langle CG \rangle_i) \times \langle S \rangle_i) - ((PR_i - CG_i) \times S_i)], \quad (57)$$

or as $$\sum_{j=1}^{n} V(P^j) = \sum_{i=1}^{l} (\langle R \rangle_i \times \langle S \rangle_i - R_i \times S_i). \quad (58)$$

Here, $V(P^j)$ is the value of the $j^{th}$ patent, $P^j$, over its life. The previous expression gives the sum of values V of all portfolio patents $P^j$. We solve this equation for $V(P^j)$. To do that, let us first assume that all active (issued and non-expired) patents contribute equal value to the portfolio. We need to account for the fact that some of the patents may have been issued later than others and will expire later (or be invalidated earlier) than others. To do that, we shall introduce a matrix P, where rows correspond to years of the portfolio's life and columns correspond to the individual patents in the portfolio. If a particular patent is active in a particular year, we write into the corresponding cell of the matrix a positive number greater than zero and less than or equal to one; if the patent has not yet been issued or has already expired, we write "0". In other words, the matrix element $p_i^j$ is positive ($0 < p_i^j \leq 1$) when, and only when, the $j^{th}$ patent is active in the year i; otherwise, it is 0. Since the value (normalized) of a patent portfolio does not depend on the number of its constituent patents, the values assigned to the individual cells of the matrix satisfy a simple rule: the sum of all elements in any row of the matrix is equal to a constant; let that constant be one. Let us call this matrix P a Patent Portfolio Weight Matrix.

For an example, consider a patent portfolio of three patents over a period of four years. Let us assume that during the first year, the portfolio has only one active patent $P^1$; during the second year, it has two patents $P_1$ and $P^2$ (the second patent just issued); during the third year, there is only one patent $P^2$ (the first patent expired at the end of the second year); and during the fourth year there are two patents: $P^2$ and $P^3$ Let us reflect these facts in a table:

|  | Patent 1 | Patent 2 | Patent 3 |
|---|---|---|---|
| Year 1 | 1 | 0 | 0 |
| Year 2 | 0.5 | 0.5 | 0 |
| Year 3 | 0 | 1 | 0 |
| Year 4 | 0 | 0.5 | 0.5 |

Note that we have apportioned the values pro rata to the number of patents active that year. In the years 2 and 4, there are two patents active, and we therefore assigned values of 0.5 to each patent in those years, so as to satisfy our rule that the sum of row elements equals to one. In other words, the value in a given cell is 1/n, where n is the number of patents active that year.

In mathematical notation, the Patent Portfolio Weight Matrix P looks, in this case, as follows:

$$P = \begin{pmatrix} 1 & 0 & 0 \\ 0.5 & 0.5 & 0 \\ 0 & 1 & 0 \\ 0 & 0.5 & 0.5 \end{pmatrix} \quad (59)$$

Generally, the Patent Portfolio Weight Matrix P gives a complete picture of what patents are active in any given year over the life of the portfolio.

We have assumed here that all patents in the portfolio were active throughout the entire year. This is an oversimplification, as patents may issue and expire at any time during the year. To account for this reality, instead of 1/n, we can assign to an active patent a number weighted pro rata according to the number of months the patent was (or will be) active that year. For example, suppose that in the Patent Portfolio Weight Matrix above, the second patent issued in the beginning of July. Then, instead of 0.5, we can assign a weighted number of 0.25 to the second patent for the second year. This automatically raises the value of the first patent to 0.75 for the same year (assuming that the second patent expires at the end of that year). The new matrix looks like this:

$$P = \begin{pmatrix} 1 & 0 & 0 \\ 0.75 & 0.25 & 0 \\ 0 & 1 & 0 \\ 0 & 0.5 & 0.5 \end{pmatrix} \quad (60)$$

The other assumption, i.e., that all patents contribute equally to the portfolio, led us to assign the same value to each patent active for the same number of months during that particular year. This need not be so. Patents may have different values. One might not, for example, assign the same value to a broad patent on a basic technology as one would assign to a narrow patent on a relatively minor improvement in the technology. The relative number of claims (particularly, independent claims), the forward citation index, and other characteristics of the constituent patents affecting their respective relative values may be reflected in the numbers assigned. (The forward citation index is the number of subsequent patents that cite the patent in question.)

One test in determining the relative values of the patents in a portfolio is to ask and answer this question: How much of the monopoly will be lost if this particular patent is removed from the portfolio (sold, expired, or invalidated)? The broader the scope of the patent claims, the broader the monopoly secured by the patent and, therefore, the higher the relative value of this patent to the portfolio. Thus, for example, if a particular patent is responsible for seventy percent of the patent monopoly, the relative value of this patent in the Portfolio Matrix can be assigned the value of 0.7.

Individual patents may change their values during their terms. For example, a patent that emerges unscathed from a reexamination proceeding in the Patent & Trademark Office, with its presumption of validity de facto enhanced, may be worth more than it was worth before the reexamination. A patent that is upheld in the course of a legal challenge in the courts may increase in value even more. Conversely, a patent whose validity is being challenged (e.g., by a third-party initiation of ex parte reexamination proceedings) is worth less for as long as its validity is in doubt. A patent also may lose some of its value with time due to technology obsolescence.

The Patent Portfolio Weight Matrix allows us to account both for individual patents having different values, relative to each other, and for patents having relative values that vary over their lives. To account for these differences, we can weight or assess each patent during each year, and assign different numbers, higher or lower values, to corresponding cells in the matrix P. When doing so, we follow the same normalization rule as above: the sum of all values in every row is equal to the same constant, such as one. For example, if, during the second year, the first patent accounted for only 40% of the portfolio value that year, while the second patent accounted for the remaining 60%, we would rewrite the matrix (59) as follows:

$$P = \begin{pmatrix} 1 & 0 & 0 \\ 0.4 & 0.6 & 0 \\ 0 & 1 & 0 \\ 0 & 0.5 & 0.5 \end{pmatrix} \quad (61)$$

If the second patent issues in July, as in matrix (60), we would have $$P = \begin{pmatrix} 1 & 0 & 0 \\ 0.7 & 0.3 & 0 \\ 0 & 1 & 0 \\ 0 & 0.5 & 0.5 \end{pmatrix} \quad (62)$$

This matrix is a Patent Portfolio Weight Matrix P weighted with respect to individual patent contributions to the portfolio's value, both over time and in relative value.

In some processes in accordance with the present invention, the Patent Portfolio Weight Matrix P can be further modified for present value calculations. Moreover, the weights can be further adjusted for relative probabilities $P_i$, E and F, as was described above in relation to adjusting present value estimates.

Thus, the Patent Portfolio Weight Matrix P can provide a good picture of which patents are active in any given year over the life of the portfolio, as well as the patents' relative values or weights.

Since the sum of all elements in any row equals to one, the sum of all elements of the matrix is equal to the number of rows—i.e., to the total number of years in the life of the portfolio (commencing with the issuance of the first patent and terminating at the end of the term of the last patent to expire). We will call this number a Portfolio Life, L. Generally, L is the sum of all elements $p_i^j$ (or, simply, the number of the rows) of the matrix P:

$$L = \sum_j \sum_i p_i^j. \quad (63)$$

We will also introduce here a Patent Weight Index $p^j$, defined as the sum of the values in a $j^{th}$ column of the matrix P $$p^j = \sum_i^t p_i^j. \quad (64)$$

Put differently, the Patent Weight Index $p^j$ is the sum of all weighted values for a given patent throughout the life of the patent. It is a weighted contribution of the individual patent to the portfolio. The Portfolio Life L is the sum of all Patent Weight Indexes $p^j$ for all constituent patents in the portfolio:

$$L = \sum_{j}^{n} p^{j}.$$

If the average annual value of a patent portfolio is $\overline{V}$, then the value $V(P^j)$ of an individual patent $P^j$ is the Patent Weight Index $p^j$ multiplied by the average annual value of the patent portfolio:

$$V(P^j) = p^j \times \overline{V}. \quad (65)$$

The value of a patent portfolio is the sum of values of the individual patents:

$$V(PP) = \sum_{j=1}^{n} p^j \times \overline{V} \text{ or } V(PP) = L \times \overline{V}.$$

Because the value of the portfolio is also equal to the sum of the incremental values over the years, see for example expression (2) above, we arrive at the following formula for the average annual value of a patent portfolio $\overline{V}$:

$$\overline{V} = \frac{1}{L} \times \sum_{i=1}^{t} [((\langle PR_i \rangle - \langle CG_i \rangle) \times \langle S_i \rangle) - ((PR_i - CG_i) \times S_i)]. \quad (66)$$

Once the average annual patent value is known, substituting it in expression (65) yields the value of an individual patent $P^j$:

$$V(P^j) = \frac{1}{L} \times p^j \times \sum_{i=1}^{t} [((\langle PR \rangle_i - \langle CG \rangle_i) \times \langle S \rangle_i) - ((PR_i CG_i) \times S_i)]. \quad (67)$$

or $$V(P^j) = \frac{1}{L} \times p^j \times \sum_{i=1}^{t} \Delta_i. \quad (68)$$

It is easy to see that for a single-patent portfolio, $p^j = L$, the value of the patent is equal to the value of the portfolio. In the case of a portfolio with n>1 patents of equal value, $p^j/L = 1/n$, the expression (67) reverts to (54), as expected.

The present value of a patent is given by this expression:

$$PV(P^j) = \frac{p^j}{L} \times \sum_{i=1}^{t} \frac{\Delta}{(1+I_i)^i}. \quad (69)$$

In the case similar to an ordinary annuity, where the incremental annual value of the patent monopoly $\Delta_i$ and the annual discount rate $I_i$ remain constant ($\Delta_i = \Delta$ and $I_i = I$) throughout the life of the portfolio, the last expression can be simplified:

$$PV(P^j) = \frac{p^j}{L} \times \Delta \left[ \frac{1 - \left[ \frac{1}{(1+I)^t} \right]}{I} \right]. \quad (70)$$

Figure 8A:
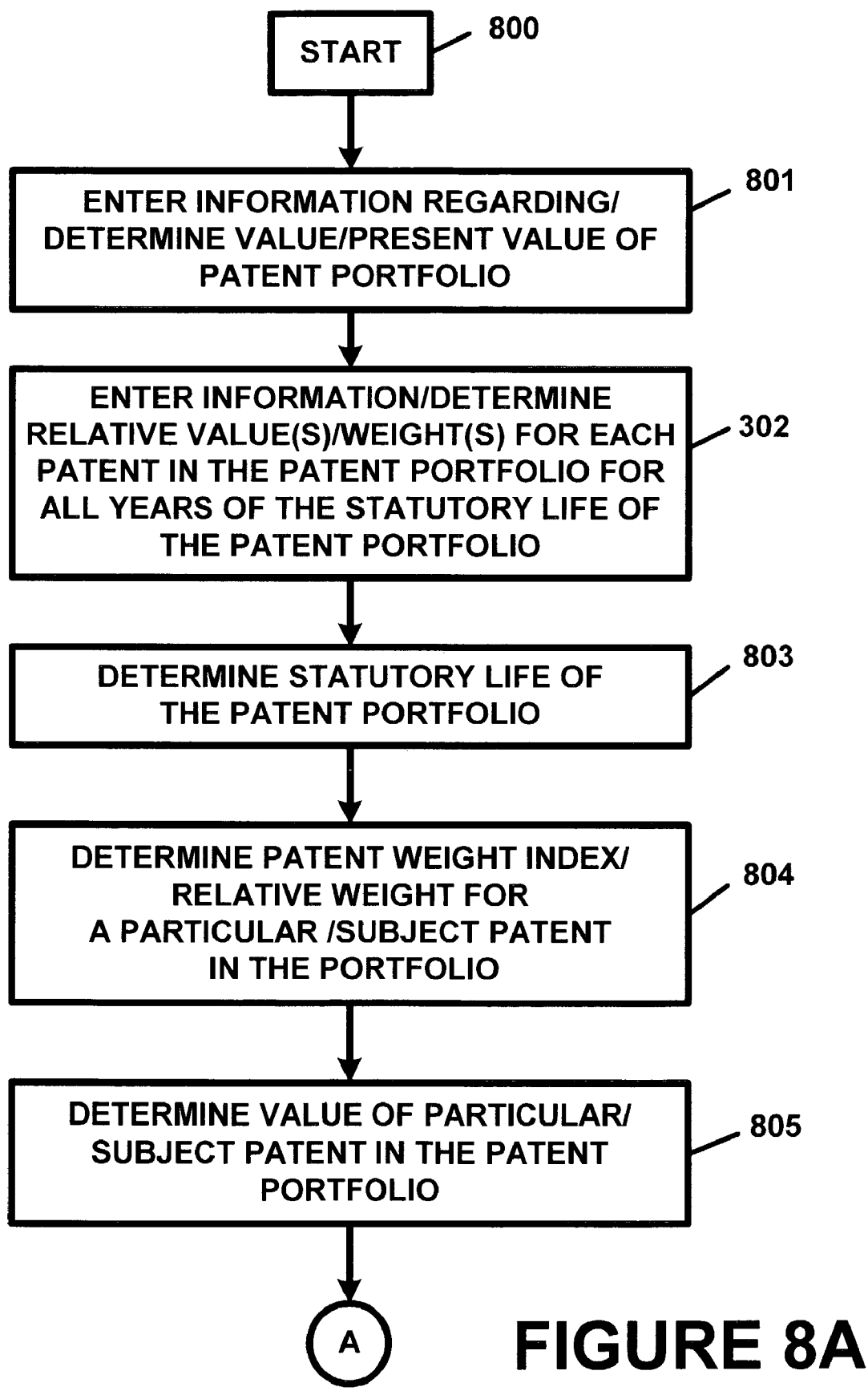
FIGS. 8A and 8B illustrate a simplified flowchart of a method for estimating the value of an individual constituent patent of a patent portfolio.
Figure 8B:
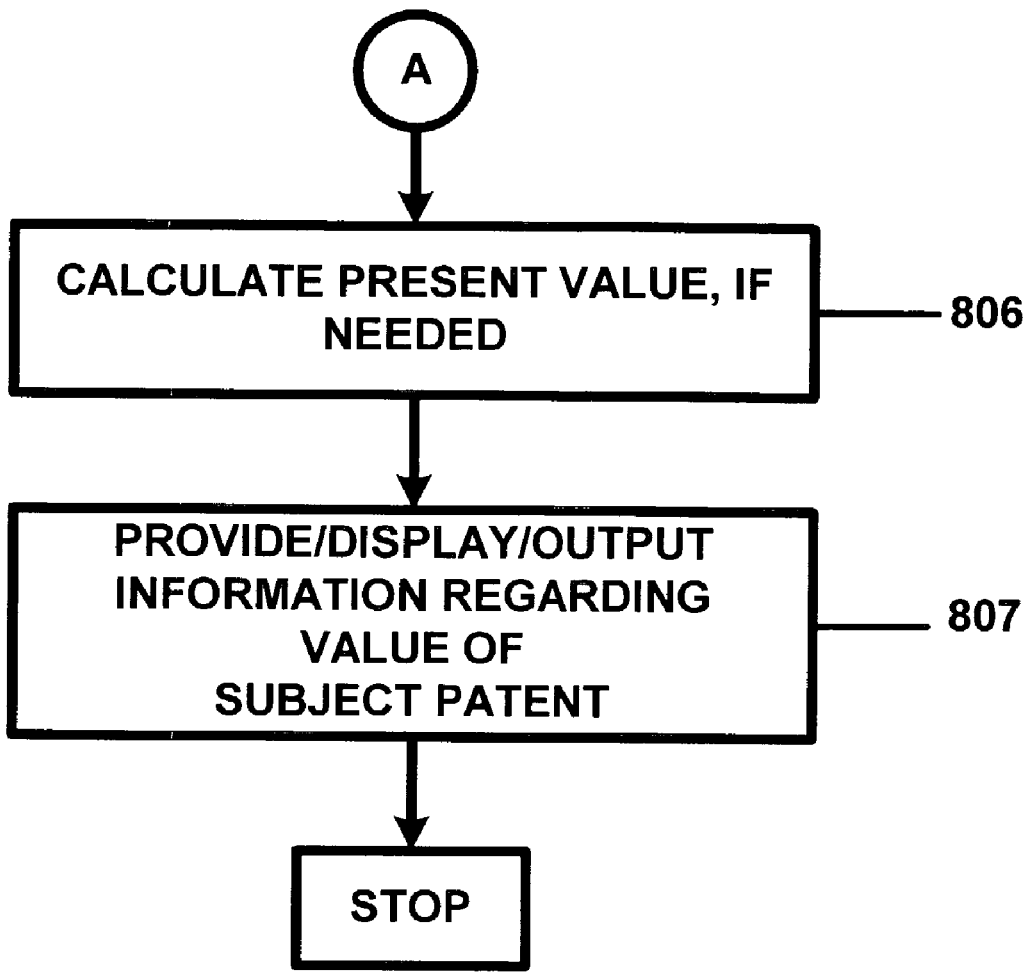

FIGS. 8A and 8B illustrate a simplified flowchart of a method for estimating the value of an individual constituent patent of a patent portfolio.

The methods and apparatuses of the present invention, or certain aspects or portions thereof, can be implemented or practiced on a computer or a plurality of computers interconnected by a network. Optionally, the methods and apparatuses of the present invention can be implemented or practiced within a client/server environment, and within the Internet environment.

Furthermore, the methods and apparatuses may take the form of program code (i.e., instructions) embodied in tangible media, such as floppy diskettes, CD-ROMS, DVDs, hard drives, or any other machine-readable storage medium, wherein, when the program code is loaded into and executed by a machine, such as a computer, the machine becomes an apparatus for practicing the invention. The methods and apparatuses of the present invention may also be embodied in the form of program code that is transmitted over some transmission medium, for example, over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The methods, apparatuses, and articles of manufacture described in this document can be employed to estimate values of various patent claims, patents, and patent portfolios. The methods, apparatuses and articles of manufacture can be employed to determine values of patents and claims characterized as utility, design, apparatus, process, method, service, article of manufacture, and business method patents and claims, or any combination thereof. In connection with the classification of business method patents, such patents include those directed to data processing operations, in which there is a significant change in the data or for performing calculation operations wherein the apparatus or method is uniquely designed for or utilized in the practice, administration, or management of an enterprise, or in the processing of financial data. This classification also provides for apparatus and corresponding methods for performing data processing or calculating operations in which a charge for goods or services is determined.

This document describes the inventive methods, apparatus, and articles of manufacture in considerable detail for illustration purposes only. Neither the specific embodiments and methods of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. Furthermore, "couple," "connect," and similar expressions with their variants do not necessarily import an immediate or direct connection, but include connections through mediate elements within their meaning. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function has been reserved for the claims and their equivalents.

I claim:

1. A computer-implemented method of computing an estimate of value EV of a first patent of a patent portfolio providing patent monopoly over an applicable period, the applicable period comprising a plurality of l subperiods, the patent portfolio comprising a plurality of n patents, the method comprising the steps of:
    (a) obtaining an average subperiodic value $\overline{V}$ of the patent portfolio over the applicable period;
    (b) generating a plurality of matrix elements $p_i^j$, one matrix element $p_i^j$ per combination of $j^{th}$ patent of the patent portfolio and sequential subperiod i of the applicable period, so that the following relationship is satisfied for $1 \leq i \leq l$:

$$\sum_{j=1}^{n} p_i^j = K,$$

where K is a real number and a constant;
    (c) computing a first patent weight index $p^1$ for the first patent by aggregating matrix elements $p_i^1$ associated with the first patent over all subperiods;
    (d) computing the estimate of value EV of the first patent according to the formula $$EV = \frac{p^1}{K} \times \overline{V};$$

and
    (e) providing the estimate of value EV through an output device;
wherein at least the steps (c) and (d) are performed using one or more computing devices.

2. A computer-implemented method according to claim 1, wherein magnitude of the matrix element $p_i^j$ depends on at least one of the following parameters:
    length of the portion of the subperiod i during which the $j^{th}$ patent is active, and
    number of patents of the patent portfolio that are active during the subperiod i.

3. A computer-implemented method according to claim 1, wherein, for a given subperiod, K is apportioned pro rata among all patents of the patent portfolio that are active during the given subperiod.

4. A computer-implemented method according to claim 1, wherein the step of generating a plurality of matrix elements comprises the steps of:
    (i) dividing the subperiod i into fractions;
    (ii) apportioning K among the fractions in proportion to lengths of the fractions, resulting in apportioned K parts, one apportioned K part per fraction;
    (iii) for each fraction, subdividing the apportioned K part corresponding to said each fraction among all patents of the portfolio that are active during said each fraction, so that each patent active during said each fraction is assigned an equal subdivision of the apportioned K part corresponding to said each fraction; and
    (iv) aggregating all subdivisions of the $j^{th}$ patent for the subperiod i to obtain the matrix element corresponding to the $j^{th}$ patent and the subperiod i.

5. A computer-implemented method according to claim 2, wherein the step of obtaining an average subperiodic value $\overline{V}$ comprises the step of computing the average subperiodic value $\overline{V}$.

6. A computer-implemented method in accordance with claim 5, wherein K is set to one.

7. A computer-implemented method according to claim 1, wherein the step of generating a plurality of matrix elements comprises the step for generating a plurality of matrix elements.

8. A computer-implemented method according to claim 2, wherein the magnitude of the matrix element $p_i^j$ depends on whether the $j^{th}$ patent has been reexamined.

9. A computer-implemented method according to claim 2, wherein the magnitude of the matrix element $p_i^j$ depends on whether the $j^{th}$ patent has been successfully litigated.

10. A computer-implemented method according to claim 2, wherein the magnitude of the matrix element $p_i^j$ depends on forward citation index of the $j^{th}$ patent.

11. A computer-implemented method according to claim 5, wherein the step of computing the average subperiodic value $\overline{V}$ comprises the steps of:
    determining a plurality of subperiodic increments of the patent monopoly by computing subperiodic differences between values derived from goods covered by the patent monopoly under conditions of the patent monopoly and corresponding values in a hypothetical freely-competitive environment without the patent monopoly, each subperiodic increment being associated with a different subperiod;
    computing a total value of the patent monopoly by aggregating the subperiodic increments over all subperiods; and
    dividing the total value of the patent monopoly by l to obtain the average subperiodic value $\overline{V}$.

12. A computer-implemented method according to claim 11, wherein the step of computing the average subperiodic value $\overline{V}$ further comprises the step of adjusting the average annual value $\overline{V}$ to reflect one or more probabilities of one or more patents of the portfolio being infringed and at least one of the following probabilities:
    one or more probabilities of one or more patents of the portfolio being enforced, and
    one or more probabilities of one or more patents of the portfolio being enforced successfully; wherein the step of adjusting the average subperiodic value $\overline{V}$ is performed before the step of dividing the total value of the patent monopoly by l.

13. A computer-implemented method according to claim 5, wherein the step of computing the average subperiodic value $\overline{V}$ comprises the steps of:
    determining a plurality of subperiodic increments of the patent monopoly by computing subperiodic differences between values derived from goods covered by the patent monopoly under conditions of the patent monopoly and corresponding values in a hypothetical freely-competitive environment without the patent monopoly, each subperiodic increment being associated with a different subperiod;
    obtaining one or more discount interest rates of the subperiods of the applicable period;

computing a discounted present value of the patent monopoly as aggregate present value of the subperiodic increments of the patent monopoly by discounting said each subperiodic increment to present value using the discount interest rate of the subperiod associated with said each subperiodic increment, and aggregating the discounted subperiodic increments over all subperiods of the applicable period; and dividing the discounted present value of the patent monopoly by l to obtain the average subperiodic value $\overline{V}$.

14. A computer-implemented method according to claim 13, wherein the step of computing the average subperiodic value $\overline{V}$ further comprises the step of adjusting the average subperiodic value $\overline{V}$ to reflect
   (I) one or more probabilities of one or more patents of the portfolio being infringed, and
   (II) at least one of the following probabilities:
      (A) one or more probabilities of one or more patents of the portfolio being enforced, and
      (B) one or more probabilities of one or more patents of the portfolio being enforced successfully;
wherein the step of adjusting the average subperiodic value $\overline{V}$ is performed before the step of dividing the total value of the patent monopoly by l.

15. A computer-implemented method according to claim 13, wherein the step of computing the average subperiodic value $\overline{V}$ further comprises the step of adjusting the average subperiodic value $\overline{V}$ to reflect
   (I) one or more probabilities of one or more patents of the portfolio being infringed, and
   (II) one or more probabilities of one or more patents of the portfolio being enforced, and
   (III) one or more probabilities of one or more patents of the portfolio being enforced successfully;
wherein the step of adjusting the average subperiodic value $\overline{V}$ is performed before the step of dividing the discounted present value of the patent monopoly by l.

16. The computer-implemented method of claim 15, wherein the values derived from the goods covered by the patent monopoly under conditions of the monopoly and the corresponding values in the hypothetical freely-competitive environment without the patent monopoly are gross profits.

17. The computer-implemented method of claim 15, wherein the values derived from the goods covered by the patent monopoly under conditions of the monopoly and the corresponding values in the hypothetical freely-competitive environment without the patent monopoly are net profits.

18. The computer-implemented method of claim 15, wherein the values derived from the goods covered by the patent monopoly under conditions of the monopoly and the corresponding values in the hypothetical freely-competitive environment without the patent monopoly are gross revenues.

19. The computer-implemented method of claim 14, wherein:
   (A) the step of determining a plurality of subperiodic increments comprises the step of determining the plurality of subperiodic increments according to the formula $\Delta_i = \langle PRFT \rangle_i - PRFT_i$, wherein:
      $\Delta_i$ denotes a subperiodic increment of the subperiod i,
      $\langle PRFT \rangle_i$ denotes profits derived from sales of the goods covered by the patent monopoly under conditions of the monopoly during the subperiod i, and
      $PRFT_i$ denotes profits derived from sales of said goods in the hypothetical freely-competitive environment without the patent monopoly during the subperiod i;
   (B) the step of computing a discounted present value comprises the step of computing the discounted present value of the patent monopoly according to the formula $$PV(PP) = \sum_{i=1}^{i=l} \frac{\Delta_i}{(1+I_i)^i},$$

wherein:
   $PV(PP)$ denotes the discounted present value of the patent monopoly, and
   $I_i$ denotes the discount interest rate for the subperiod i; and
   (C) the step of adjusting comprises the step of adjusting the discounted present value of the patent monopoly, to obtain a risk-adjusted present value of the patent monopoly, according to the formula $AdjPV(PP) = (1-P \times (1-E \times F)) \times PV(PP)$, wherein:
      $AdjPV(PP)$ denotes the adjusted present value of the patent monopoly,
      P denotes a probability that at least one patent of the patent portfolio will be infringed,
      E denotes a probability that the patent portfolio will be enforced, and
      F denotes a probability that the patent portfolio will be enforced successfully.

20. The computer-implemented method of claim 15, wherein:
   (A) the step of determining a plurality of subperiodic increments comprises the step of determining the plurality of subperiodic increments according to the formula $\Delta_i = \langle PRFT \rangle_i - PRFT_i$, wherein:
      $\Delta_i$ denotes a subperiodic increment of the subperiod i,
      $\langle PRFT \rangle_i$ denotes profits derived from sales of the goods covered by the patent monopoly under conditions of the monopoly during the subperiod i, and
      $PRFT_i$ denotes profits derived from sales of said goods in the hypothetical freely-competitive environment without the patent monopoly during the subperiod i;
   (B) the step of computing a discounted present value comprises the step of computing the discounted present value of the patent monopoly according to the formula $$PV(PP) = \sum_{i=1}^{i=l} \frac{\Delta_i}{(1+I_i)^i},$$

wherein:
   $PV(PP)$ denotes the discounted present value of the patent monopoly, and
   $I_i$ denotes the discount interest rate for the subperiod i; and
   (C) the step of adjusting comprises the step of adjusting the discounted present value of the patent monopoly, to obtain a risk-adjusted present value of the patent monopoly, according to the formula $AdjPV(PP) = (1-P \times (1-E \times F)) \times PV(PP)$, wherein:
      $AdjPV(PP)$ denotes the adjusted present value of the patent monopoly,
      P denotes a probability that at least one patent of the patent portfolio will be infringed,
      E denotes a probability that the patent portfolio will be enforced, and F denotes a probability that the patent portfolio will be enforced successfully.

21. The computer-implemented method of claim 20, wherein the patent portfolio is owned by an owner, the step of adjusting further comprising the steps of:
determining a probability $E_w$ of the owner being willing to enforce the patent monopoly during the applicable period;
determining a probability $E_a$ of the owner being able to enforce the patent monopoly during the applicable period; and
computing E by multiplying the probability $E_w$ by the probability $E_a$.

22. The computer-implemented method of claim 21, the method further comprising the step of computing the probability F according to the formula: $F=1-(1-F_v \times F_i \times F_e)^n$, wherein:
$F_v$ denotes a probability that any individual patent of the patent portfolio will be found not invalid;
$F_e$ denotes a probability that any individual patent of the patent portfolio will be found not unenforceable; and
$F_i$ denotes a probability that any individual patent of the patent portfolio will be found infringed during the applicable period.

23. The computer-implemented method of claim 20, further comprising the step of computing the probability F according to the formula:

$$F = 1 - \prod_{j=1}^{n} (1 - F_v^j \times F_i^j \times F_e^j),$$

wherein:
(I) $F_v^j$ denotes a probability that the $j^{th}$ patent of the patent portfolio will be found not invalid, for $1 \leq j \leq n$;
(II) $F_e^j$ denotes a probability that the $j^{th}$ patent of the patent portfolio will be found not unenforceable, for $1 \leq j \leq n$; and
(III) $F_i^j$ denotes a probability that they $j^{th}$ patent of the patent portfolio will be found infringed during the applicable period, for $1 \leq j \leq n$.

24. A computer-implemented method according to claim 5, wherein the step of computing the average subperiodic value $\nabla$ comprises the steps of:
(i) determining a plurality of subperiodic increments of the patent monopoly according to the formula $C_i = (\langle PR \rangle_i - \langle CG \rangle_i) \times \langle S \rangle_i - (PR_i - CG_i) \times S_i$, wherein:
(I) $\langle PR \rangle_i$ is an average unit price of goods covered by the patent portfolio during the subperiod i under the patent monopoly of the patent portfolio,
(II) $\langle CG \rangle_i$ is an average unit cost of the goods during the subperiod i under the patent monopoly,
(III) $\langle S \rangle_i$ is unit sales volume of the goods during the subperiod i under the patent monopoly,
(IV) $PR_i$ is an average unit price of the goods during the subperiod i in a hypothetical freely-competitive environment without the patent monopoly,
(V) $CG_i$ is an average unit cost of the goods during the subperiod i in the hypothetical freely-competitive environment without the patent monopoly,
(VI) $S_i$ is unit sales volume of the goods during the subperiod i in the hypothetical freely-competitive environment without the patent monopoly, and
(VII) $C_i$ is a subperiodic increment of the subperiod i; and (ii) determining discount interest rates for the subperiods of the applicable period;
(iii) computing a discounted present value of the patent monopoly as aggregate present value of the subperiodic increments of the patent monopoly by discounting each subperiodic increment to present value using the discount interest rate of the subperiod associated with said each subperiodic increment, and aggregating the discounted subperiodic increments over all subperiods; and
(iv) dividing the discounted present value of the patent monopoly by l to obtain the average subperiodic value $\nabla$.

25. A computer-implemented method according to claim 24, wherein the step of determining discount interest rates comprises the step of determining discount interest rates for the subperiods of the applicable periods based on uncertainties associated with forecasting future revenues and risk of infringement of the patent monopoly.

26. A computer-implemented method according to claim 13, wherein:
(I) the step of obtaining one or more discount interest rates comprises the step of setting each of the discount interest rates of the subperiods equal to a first constant I;
(II) the step of determining a plurality of subperiodic increments comprises the step of setting each of the subperiodic increments to a second constant $\Delta$; and
(III) the step of computing a discounted present value comprises the step of computing the discounted present value of the patent monopoly according to the formula $$PV(P) = \Delta \times \left[ \frac{1 - \left[\frac{1}{(1+I)^l}\right]}{I} \right],$$

wherein PV(P) denotes the discounted present value of the patent monopoly.

27. A computer-implemented method of computing an estimate of value EV of a constituent patent of a patent portfolio providing patent monopoly over an applicable period, the applicable period comprising a plurality of l subperiods, the patent portfolio comprising a plurality of n patents, the method comprising the steps of:
(a) a step for obtaining an average subperiodic value $\nabla$ of the patent portfolio over the applicable period;
(b) a step for generating a plurality of matrix elements $p_i^j$, one matrix element $p_i^j$ per combination of $j^{th}$ patent of the patent portfolio and sequential subperiod i of the applicable period, so that the following relationship is satisfied for $1 \leq i \leq l$:

$$\sum_{j=1}^{n} p_i^j = K,$$

where $p_i^j$ are real numbers and K is a constant;
(c) a step for computing with one or more computing devices a first patent weight index $p^1$ for the constituent patent;
(d) computing with one or more computing devices the estimate of value EV of the constituent patent according to the formula $$EV = \frac{p^j}{K} \times \overline{V};$$

and (e) providing the estimate of value EV through an output device.

28. An article of manufacture comprising a machine-readable storage medium with instruction code stored in the medium, said instruction code, when executed by a data processing system comprising a processor, causes the processor to perform the following steps to compute an estimate of value EV of a first patent of a patent portfolio providing patent monopoly over an applicable period, the applicable period comprising a plurality of l subperiods, the patent portfolio comprising a plurality of n patents:

(a) obtaining an average subperiodic value $\overline{V}$ of the patent portfolio over the applicable period;

(b) generating a plurality of matrix elements $p_i^j$, one matrix element $p_i^j$ per combination of $j^{th}$ patent of the patent portfolio and sequential subperiod i of the applicable period, so that the following relationship is satisfied for $1 \leq i \leq l$:

$$\sum_{j=1}^{n} p_i^j = K,$$

where $p_i^j$ are real numbers and K is a constant;

(c) computing a first patent weight index $p^1$ for the first patent by aggregating the matrix elements $p_i^j$ associated with the first patent over all subperiods;

(d) computing the estimate of value EV of the first patent according to the formula $$EV = \frac{p^1}{K} \times \overline{V};$$

and (e) outputting the estimate of value EV through an output device.

29. An article of manufacture according to claim 28, wherein the instruction code causes the processor to generate the matrix elements so that magnitude of the matrix element $p_i^j$ depends on at least one of the following parameters:

length of the portion of the subperiod i during which the $j^{th}$ patent is active, and number of patents of the patent portfolio that are active during the subperiod i.

30. An article of manufacture according to claim 28, wherein the instruction code causes the processor to generate the matrix elements so that, for a given subperiod, K is apportioned pro rata among all patents of the patent portfolio that are active during the given subperiod.

31. An article of manufacture according to claim 28, wherein the instruction code causes the processor to perform the following steps when performing the step of generating the matrix elements:

(i) dividing the subperiod i into fractions;

(ii) apportioning K among the fractions in proportion to lengths of the fractions, resulting in apportioned K parts, one apportioned K part per fraction;

(iii) for each fraction, subdividing the apportioned K part corresponding to said each fraction among all patents of the portfolio that are active during said each fraction, so that each patent active during said each fraction is assigned an equal subdivision of the apportioned K part corresponding to said each fraction; and (iv) aggregating all subdivisions of the $j^{th}$ patent for the subperiod i to obtain the matrix element corresponding to the $j^{th}$ patent and the subperiod i.

32. An article of manufacture according to claim 29, wherein the instruction code causes the processor to perform the following steps when performing the step of obtaining an average subperiodic value $\overline{V}$:

receiving information from which the average subperiodic value $\overline{V}$ can be determined; and computing the average subperiodic value $\overline{V}$ from the information.

33. An article of manufacture in accordance with claim 32, wherein the instruction code causes the processor to set K to one.

34. An article of manufacture according to claim 28, wherein the instruction code causes the processor to perform the step for generating a plurality of matrix elements when performing the step of generating the matrix elements.

35. An article of manufacture according to claim 29, wherein the instruction code causes the processor to generate the matrix elements so that the magnitude of the matrix element $p_i^j$ depends on whether the $j^{th}$ patent has been reexamined.

36. An article of manufacture according to claim 29, wherein the instruction code causes the processor to generate the matrix elements so that the magnitude of the matrix element $p_i^j$ depends on whether the $j^{th}$ patent has been successfully litigated.

37. An article of manufacture according to claim 29, wherein the instruction code causes the processor to generate the matrix elements so that the magnitude of the matrix element $p_i^j$ depends on forward citation index of the $j^{th}$ patent.

38. An article of manufacture according to claim 32, wherein the instruction code causes the processor to perform the following steps when performing the step of computing the average subperiodic value $\overline{V}$:

determining a plurality of subperiodic increments of the patent monopoly by computing subperiodic differences between values derived from goods covered by the patent monopoly under conditions of the patent monopoly and corresponding values in a hypothetical environment without the patent monopoly, each subperiodic increment being associated with a different subperiod;

computing a total value of the patent monopoly by aggregating the subperiodic increments over all subperiods; and dividing the total value of the patent monopoly by l to obtain the average subperiodic value $\overline{V}$.

39. An article of manufacture according to claim 38, wherein the instruction code causes the processor further to perform the following steps when performing the step of computing the average subperiodic value $\overline{V}$: adjusting the average subperiodic value $\overline{V}$ to reflect one or more probabilities of one or more patents of the portfolio being infringed and at least one of the following probabilities:

one or more probabilities of one or more patents of the portfolio being enforced, and one or more probabilities of one or more patents of the portfolio being enforced successfully; wherein the step of adjusting the average subperiodic value $\overline{\nabla}$ is performed before the step of dividing the total value of the patent monopoly by l.

40. An article of manufacture according to claim 32, wherein the instruction code causes the processor, when performing the step of computing the average subperiodic value $\overline{\nabla}$, to perform the steps of:
   determining a plurality of subperiodic increments of the patent monopoly by computing subperiodic differences between values derived from goods covered by the patent monopoly under conditions of the patent monopoly and corresponding values in a hypothetical environment without the patent monopoly, each subperiodic increment being associated with a different subperiod;
   obtaining one or more discount interest rates of the subperiods of the applicable period;
   computing a discounted present value of the patent monopoly as aggregate present value of the subperiodic increments of the patent monopoly by discounting said each subperiodic increment to present value using the discount interest rate of the subperiod associated with said each subperiodic increment, and aggregating the discounted subperiodic increments over all subperiods of the applicable period; and
   dividing the discounted present value of the patent monopoly by l to obtain the average subperiodic value $\overline{\nabla}$.

41. An article of manufacture according to claim 40, wherein the instruction code causes the processor, when performing the step of computing the average subperiodic value $\overline{\nabla}$, further to perform the step of adjusting the average subperiodic value $\overline{\nabla}$ to reflect
   (I) one or more probabilities of one or more patents of the portfolio being infringed, and
   (II) at least one of the following probabilities:
      (A) one or more probabilities of one or more patents of the portfolio being enforced, and
      (B) one or more probabilities of one or more patents of the portfolio being enforced successfully;
wherein the step of adjusting the average subperiodic value $\overline{\nabla}$ is performed before the step of dividing the total value of the patent monopoly by l.

42. An article of manufacture according to claim 40, wherein the instruction code causes the processor, when performing the step of computing the average subperiodic value $\overline{\nabla}$, further to perform the step of adjusting the average subperiodic value $\overline{\nabla}$ to reflect
   (I) one or more probabilities of one or more patents of the portfolio being infringed,
   (II) one or more probabilities of one or more patents of the portfolio being enforced, and
   (III) one or more probabilities of one or more patents of the portfolio being enforced successfully;
wherein the step of adjusting the average subperiodic value $\overline{\nabla}$ is performed before the step of dividing the total value of the patent monopoly by l.

43. The article of manufacture according to claim 42, wherein the values derived from the goods covered by the patent monopoly under conditions of the monopoly and the corresponding values in the hypothetical freely-competitive environment without the patent monopoly are gross profits.

44. The article of manufacture according to claim 42, wherein the values derived from the goods covered by the patent monopoly under conditions of the monopoly and the corresponding values in the hypothetical freely-competitive environment without the patent monopoly are net profits.

45. The article of manufacture according to claim 42, wherein the values derived from the goods covered by the patent monopoly under conditions of the monopoly and the corresponding values in the hypothetical freely-competitive environment without the patent monopoly are gross revenues.

46. The article of manufacture according to claim 41, wherein:
   (A) the instruction code causes the processor, when performing the step of determining a plurality of subperiodic increments, to perform the step of determining the plurality of subperiodic increments according to the formula $\Delta_i = \langle PRFT \rangle_i - PRFT_i$, wherein:
      $\Delta_i$ denotes a subperiodic increment of the subperiod i,
      $\langle PRFT \rangle_i$ denotes profits derived from sales of the goods covered by the patent monopoly under conditions of the monopoly during the subperiod i, and
      $PRFT_i$ denotes profits derived from sales of said goods in the freely-competitive hypothetical environment without the patent monopoly during the subperiod i;
   (B) the instruction code causes the processor, when performing the step of computing a discounted present value, to perform the step of computing the discounted present value of the patent monopoly according to the formula $$PV(PP) = \sum_{i=1}^{i=l} \frac{\Delta_i}{(1+I_i)^i},$$

wherein:
   PV(PP) denotes the discounted present value of the patent monopoly, and
   $I_i$ denotes the discount interest rate for the subperiod i; and
   (C) the instruction code causes the processor, when performing the step of adjusting, to perform the step of obtaining a risk-adjusted present value of the patent monopoly according to the formula $AdjPV(PP) = (1 - P \times (1 - E \times F)) \times PV(PP)$, wherein:
      AdjPV(PP) denotes the risk-adjusted present value of the patent monopoly,
      P denotes a probability that at least one patent of the patent portfolio will be infringed,
      E denotes a probability that the patent portfolio will be enforced, and
      F denotes a probability that the patent portfolio will be enforced successfully.

47. The article of manufacture according to claim 42, wherein:
   (A) the instruction code causes the processor, when performing the step of determining a plurality of subperiodic increments, to perform the step of determining the plurality of subperiodic increments according to the formula $\Delta_i = \langle PRFT \rangle_i - PRFT_i$, wherein:
      $\Delta_i$ denotes a subperiodic increment of the subperiod i,
      $\langle PRFT \rangle_i$ denotes profits derived from sales of the goods covered by the patent monopoly under conditions of the monopoly during the subperiod i, and
      $PRFT_i$ denotes profits derived from sales of said goods in the freely-competitive hypothetical environment without the patent monopoly during the subperiod i;
   (B) the instruction code causes the processor, when performing the step of computing a discounted present value, to perform the step of computing the discounted present value of the patent monopoly according to the formula $$PV(PP) = \sum_{i=1}^{i=I} \frac{\Delta_i}{(1+I_i)^i},$$

wherein:
PV(PP) denotes the discounted present value of the patent monopoly, and
$I_i$ denotes the discount interest rate for the subperiod i; and
(C) the instruction code causes the processor, when performing the step of adjusting, to perform the step of obtaining a risk-adjusted present value of the patent monopoly according to the formula AdjPV(PP)=(1−P×(1−E×F))×PV(PP), wherein:
AdjPV(PP) denotes the risk-adjusted present value of the patent monopoly,
P denotes a probability that at least one patent of the patent portfolio will be infringed,
E denotes a probability that the patent portfolio will be enforced, and
F denotes a probability that the patent portfolio will be enforced successfully.

48. The article of manufacture according to claim 47, wherein the patent portfolio is owned by an owner, and the instruction code causes the processor, when performing the step of adjusting, further to perform the steps of:
determining a probability $E_w$ of the owner being willing to enforce the patent monopoly during the applicable period;
determining a probability $E_a$ of the owner being able to enforce the patent monopoly during the applicable period; and
computing E by multiplying the probability $E_w$ by the probability $E_a$.

49. The article of manufacture according to claim 48, wherein the instruction code further causes the processor to perform the step of computing the probability F according to the formula: $F=1-(1-F_v \times F_i \times F_e)^n$, wherein:
$F_v$ denotes a probability that any individual patent of the patent portfolio will be found not invalid;
$F_e$ denotes a probability that any individual patent of the patent portfolio will be found not unenforceable; and
$f_i$ denotes a probability that any individual patent of the patent portfolio will be found infringed during the applicable period.

50. The article of manufacture according to claim 47, wherein the instruction code further causes the processor to perform the step of computing the probability F according to the formula:

$$F = 1 - \prod_{j=1}^{n} (1 - F_v^j \times F_i^j \times F_e^j),$$

wherein:
(I) $F_v^j$ denotes a probability that the $j^{th}$ patent of the patent portfolio will be found not invalid, for $1 \leq j \leq n$;
(II) $F_e^j$ denotes a probability that the $j^{th}$ patent of the patent portfolio will be found not unenforceable, for $1 \leq j \leq n$; and
(III) $F_i^j$ denotes a probability that the $j^{th}$ patent of the patent portfolio will be found infringed during the applicable period, for $1 \leq j \leq n$.

51. An article of manufacture according to claim 32, wherein the instruction code causes the processor, when performing the step of computing the average subperiodic value $\overline{V}$, to perform the steps of:
(i) determining a plurality of subperiodic increments of the patent monopoly according to the formula $C_i = (\langle PR \rangle_i - \langle CG \rangle_i) \times \langle S \rangle_i - (PR_i - CG_i) \times S_i$, wherein:
(I) $\langle PR \rangle_i$ is an average unit price of goods covered by the patent portfolio during the subperiod i under the patent monopoly of the patent portfolio,
(II) $\langle CG \rangle_i$ is an average unit cost of the goods during the subperiod i under the patent monopoly,
(III) $\langle S \rangle_i$ is unit sales volume of the goods during the subperiod i under the patent monopoly,
(IV) $PR_i$ is an average unit price of the goods during the subperiod i in a hypothetical environment without the patent monopoly,
(V) $CG_i$ is an average unit cost of the goods during the subperiod i in the hypothetical environment without the patent monopoly,
(VI) $S_i$ is unit sales volume of the goods during the subperiod i in the hypothetical environment without the patent monopoly, and
(VII) $C_i$ is a subperiodic increment of the subperiod i; and
(ii) determining discount interest rates for the subperiods of the applicable period;
(iii) computing a discounted present value of the patent monopoly as aggregate present value of the subperiodic increments of the patent monopoly by discounting each subperiodic increment to present value using the discount interest rate of the subperiod associated with said each subperiodic increment, and aggregating the discounted subperiodic increments over all subperiods; and
(iv) dividing the discounted present value of the patent monopoly by I to obtain the average subperiodic value $\overline{V}$.

52. An article of manufacture according to claim 51, wherein the instruction code causes the processor, when performing the step of determining discount interest rates, to perform the step of determining discount interest rates for the subperiods of the applicable periods based on uncertainties associated with forecasting future revenues and risk of infringement of the patent monopoly.

53. An article of manufacture according to claim 40, wherein:
(I) the instruction code causes the processor, when performing the step of obtaining one or more discount interest rates, to perform the step of setting each of the discount interest rates of the subperiods equal to a first constant I;
(II) the instruction code causes the processor, when performing the step of determining a plurality of subperiodic increments, to perform the step of setting each of the subperiodic increments to a second constant $\Delta$; and
(III) the instruction code causes the processor, when performing the step of computing a discounted present value, to perform the step of computing the discounted present value of the patent monopoly according to the formula $$PV(P) = \Delta \times \left[\frac{1 - \left[\frac{1}{(1+I)^l}\right]}{I}\right],$$

wherein PV(P) denotes the discounted present value of the patent monopoly.

54. An article of manufacture comprising a machine-readable storage medium with instruction code stored in the medium, said instruction code, when executed by a data processing system comprising a processor, causes the processor to perform the following steps to compute an estimate of value EV of a first patent of a patent portfolio providing patent monopoly over an applicable period, the applicable period comprising a plurality of l subperiods, the patent portfolio comprising a plurality of n patents:

(a) a step for obtaining an average subperiodic value $\overline{V}$ of the patent portfolio over the applicable period;

(b) a step for generating a plurality of matrix elements $p_i^j$, one matrix element $p_i^j$ per combination of $j^{th}$ patent of the patent portfolio and sequential subperiod i of the applicable period, so that the following relationship is satisfied for $1 \leq i \leq l$:

$$\sum_{j=1}^{n} p_i^j = K,$$

where $p_i^j$ are real numbers and K is a constant;

(c) a step for computing a first patent weight index $p^1$ for the first patent;

(d) computing the estimate of value EV of the first patent according to the formula $$EV = \frac{p^1}{K} \times \overline{V};$$

and (e) providing the estimate of value EV through an output device.

55. A system for computing an estimate of value EV of a first patent of a patent portfolio providing patent monopoly over an applicable period, the applicable period comprising a plurality of l subperiods, the patent portfolio comprising a plurality of n patents, the system comprising:

a processor;

an input device coupled to the processor, the input device being capable of providing information to the processor; and an output device coupled to the processor;

wherein the processor receives, through the input device, data sufficient to obtain (i) an average subperiodic value $\overline{V}$ of the patent portfolio over the applicable period; and (ii) a plurality of matrix elements $p_i^j$, one matrix element $p_i^j$ per combination of $j^{th}$ patent of the patent portfolio and sequential subperiod i of the applicable period, the matrix element $p_i^j$ providing a relative value of the $j^{th}$ patent during the subperiod i;

the processor computes the plurality of matrix elements $p_i^j$ so that the following relationship is satisfied for $1 \leq i \leq l$:

$$\sum_{j=1}^{n} p_i^j = K,$$

where the matrix elements $p_i^j$ are real numbers and K is a constant;

the processor computes a first patent weight index $p^1$ for the first patent by aggregating the matrix elements $p_i^j$ associated with the first patent over all subperiods;

the processor computes the estimate of value EV of the first patent according to the formula $$EV = \frac{p^1}{K} \times \overline{V};$$

and the output device outputs the estimate of value EV.

56. A system according to claim 55, wherein:

the processor computes the matrix elements so that magnitude of the matrix element $p_i^j$ depends on at least one of the following parameters:

length of the portion of the subperiod i during which the $j^{th}$ patent is active, and number of patents of the patent portfolio that are active during the subperiod i; and the processor sends EV to the output device.

57. A system according to claim 55, wherein, for a given subperiod, the processor apportions the constant K pro rata among all patents of the patent portfolio that are active during the given subperiod.

58. A system according to claim 55, wherein the processor:

(i) divides the subperiod i into fractions;

(ii) apportions the constant K among the fractions in proportion to lengths of the fractions; resulting in apportioned K parts, one apportioned K part per fraction;

(iii) for each fraction, subdivides the apportioned K part corresponding to said each fraction among all patents of the portfolio that are active during said each fraction, so that each patent active during said each fraction is assigned an equal subdivision of the apportioned K part corresponding to said each fraction; and (iv) aggregates all subdivisions of the $j^{th}$ patent for the subperiod i to obtain the matrix element corresponding to the $j^{th}$ patent and the subperiod i.

59. A system according to claim 56, wherein the processor computes the average subperiodic value $\overline{V}$ from the data.

60. A system in accordance with claim 59, wherein the processor sets K to one.

61. A system according to claim 56, wherein the processor computes the magnitude of the matrix element $p_i^j$ based at least in part on whether the $j^{th}$ patent has been reexamined.

62. A system according to claim 56, wherein the processor computes the magnitude of the matrix element $p_i^j$ based at least in part on whether the $j^{th}$ patent has been successfully litigated.

63. A system according to claim 56, wherein the magnitude of the matrix element $p_i^j$ depends on forward citation index of the $j^{th}$ patent.

64. A system according to claim 56, wherein the magnitude of the matrix element $p_i^j$ depends on the number of claims of the $j^{th}$ patent.

65. A system according to claim 64, wherein said claims of the $j^{th}$ patent are independent claims.

66. A system according to claim 59, wherein the processor and the input device are coupled by a computer communication network, and wherein the processor:
  computes a plurality of subperiodic increments of the patent monopoly by computing subperiodic differences between values derived from goods covered by the patent monopoly under conditions of the patent monopoly and corresponding values in a hypothetical environment without the patent monopoly, each subperiodic increment being associated with a different subperiod;
  receives one or more discount interest rates of the subperiods of the applicable period;
  computes a discounted present value of the patent monopoly as aggregate present value of the subperiodic increments of the patent monopoly by discounting said each subperiodic increment to present value using the discount interest rate of the subperiod associated with said each subperiodic increment, and aggregates the discounted subperiodic increments over all subperiods of the applicable period; and
  divides the discounted present value of the patent monopoly by/to obtain the average subperiodic value $\overline{V}$.

67. A system according to claim 66, wherein the processor, before dividing the total value of the patent monopoly by l, adjusts the average subperiodic value $\overline{V}$ to reflect
  (I) one or more probabilities of one or more patents of the portfolio being infringed,
  (II) one or more probabilities of one or more patents of the portfolio being enforced, and
  (III) one or more probabilities of one or more patents of the portfolio being enforced successfully.

68. The system of claim 67, wherein:
  (A) the processor receives from the input device a number $\langle PRFT \rangle_i$ indicating profits derived from sales of the goods covered by the patent monopoly under conditions of the monopoly during the subperiod i;
  (B) the processor receives from the input device a number $PRFT_i$ indicating profits derived from sales of the goods covered by the patent monopoly in the hypothetical environment without the patent monopoly during the subperiod i;
  (C) the processor receives from the input device a number $I_i$ indicating the discount interest rate for the subperiod i;
  (D) the processor computes the discounted present value PV(PP) from the formula $$PV(PP) = \sum_{i=1}^{i=l} \frac{\langle PRFT \rangle_i - PRFT_i}{(1+I_i)^i},$$

and
  (E) the processor adjusts the discounted present value of the patent monopoly, to obtain an adjusted present value of the patent monopoly, according to the formula AdjPV (PP)=(1−P×(1−E×F))×PV(PP), wherein:
  AdjPV(PP) denotes the adjusted present value of the patent monopoly,
  P denotes a probability that at least one patent of the patent portfolio will be infringed,
  E denotes a probability that the patent portfolio will be enforced, and
  F denotes a probability that the patent portfolio will be enforced successfully.

69. The system of claim 68, wherein the patent portfolio is owned by an owner, and the processor computes E by multiplying a probability $E_w$ of the owner being willing to enforce the patent monopoly by a probability $E_a$ of the owner being able to enforce the patent monopoly.

70. The system of claim 69, the processor computes the probability F according to the formula: $F=1-(1-F_v \times F_i F_e)^n$, wherein:
  $F_v$ denotes a probability that any individual patent of the patent portfolio will be found not invalid;
  $F_e$ denotes a probability that any individual patent of the patent portfolio will be found not unenforceable; and
  $F_i$ denotes a probability that any individual patent of the patent portfolio will be found infringed during the applicable period.

71. A computer-implemented method of computing an estimate of value EV of a first patent of a patent portfolio providing patent monopoly over an applicable period, the applicable period comprising a plurality of l subperiods, the patent portfolio comprising a plurality of n patents, the method comprising the steps of:
  (a) receiving from an input source, through a computer communication network, information sufficient to compute an average subperiodic value $\overline{V}$ of the patent portfolio over the applicable period;
  (b) receiving from the input source, through a computer communication network, information sufficient to generate a plurality of matrix elements $p_i^j$, each matrix element $p_i^j$ reflecting relative weight of $j^{th}$ patent of the patent portfolio during sequential subperiod i of the applicable period;
  (c) computing the average subperiodic value $\overline{V}$;
  (d) generating the plurality of matrix elements $p_i^j$, one matrix element $p_i^j$ per combination of the $j^{th}$ patent and the subperiod i, so that the following relationship is satisfied for $1 \leq i \leq l$:

$$\sum_{j=1}^{n} p_i^j = K,$$

where the matrix elements $p_i^j$ are real numbers and K is a constant;
  (e) computing a first patent weight index $p^1$ for the first patent by aggregating over all subperiods the matrix elements $p_i^j$ associated with the first patent;
  (f) computing the estimate of value EV of the first patent according to the formula $$EV = \frac{p^1}{K} \times \overline{V};$$

and
  (g) providing the estimate of value EV through an output device;
  wherein at least the steps (c), (e), and (f) are performed using one or more computing devices.

72. A computer-implemented method according to claim 71, wherein magnitude of the matrix element $p_i^j$ depends on at least one of the following parameters:
  length of the portion of the subperiod i during which the $j^{th}$ patent is active, and number of patents of the patent portfolio that are active during the subperiod i.

73. A computer-implemented method according to claim 71, wherein, for a given subperiod, K is apportioned pro rata among all patents of the patent portfolio that are active during the given subperiod.

74. A computer-implemented method according to claim 71, wherein the step of generating the plurality of matrix elements comprises the steps of:
   (i) dividing the subperiod i into fractions;
   (ii) apportioning K among the fractions in proportion to lengths of the fractions, resulting in apportioned K parts, one apportioned K part per fraction;
   (iii) for each fraction, subdividing the apportioned K part corresponding to said each fraction among all patents of the portfolio that are active during said each fraction, so that each patent active during said each fraction is assigned an equal subdivision of the apportioned K part corresponding to said each fraction; and
   (iv) aggregating all subdivisions of the $j^{th}$ patent for the subperiod i to obtain the matrix element corresponding to the $j^{th}$ patent and the subperiod i.

75. A computer-implemented method in accordance with claim 72, wherein K is set to one.

76. A computer-implemented method according to claim 71, wherein the step of generating a plurality of matrix elements comprises the step for generating a plurality of matrix elements.

77. A computer-implemented method according to claim 72, wherein the magnitude of the matrix element $p_i^j$ depends on whether the $j^{th}$ patent has been reexamined.

78. A computer-implemented method according to claim 72, wherein the magnitude of the matrix element $p_i^j$ depends on whether the $j^{th}$ patent has been successfully litigated.

79. A computer-implemented method according to claim 72, wherein the magnitude of the matrix element $p_i^j$ depends on forward citation index of the $j^{th}$ patent.

80. A computer-implemented method according to claim 72, wherein:
   (i) the step of receiving from an input source, through a computer communication network, information sufficient to compute an average subperiodic value $\nabla$ comprises the step of receiving from the input device, through the computer communication network, values derived from goods covered by the patent monopoly under conditions of the patent monopoly and corresponding values in a hypothetical environment without the patent monopoly;
   (ii) the step of computing the average subperiodic value $\nabla$ comprises the steps of:
      computing a plurality of subperiodic increments of the patent monopoly, each subperiodic increment comprising a subperiodic difference between value derived from the goods covered by the patent monopoly under conditions of the patent monopoly and the corresponding value in the hypothetical environment without the patent monopoly, said each subperiodic increment being associated with a different subperiod;
      computing a total value of the patent monopoly by aggregating the subperiodic increments over all subperiods; and
      dividing the total value of the patent monopoly by 1 to obtain the average subperiodic value $\nabla$.

81. A computer-implemented method according to claim 80, wherein the step of computing the average subperiodic value $\nabla$ further comprises the step of adjusting the average subperiodic value $\nabla$ to reflect one or more probabilities of one or more patents of the portfolio being infringed and at least one of the following probabilities:
   one or more probabilities of one or more patents of the portfolio being enforced, and
   one or more probabilities of one or more patents of the portfolio being enforced successfully;
wherein the step of adjusting the average subperiodic value $\nabla$ is performed before the step of dividing the total value of the patent monopoly by 1.

82. A computer-implemented method according to claim 72, wherein:
   (i) the step of receiving from an input source, through a computer communication network, information sufficient to compute an average subperiodic value $\nabla$ comprises the step of receiving from the input device, through the computer communication network, one or more discount interest rates of the subperiods of the applicable period, values derived from goods covered by the patent monopoly under conditions of the patent monopoly, and corresponding values in a hypothetical environment without the patent monopoly;
   (ii) the step of computing the average subperiodic value $\nabla$ comprises the steps of:
      computing a plurality of subperiodic increments of the patent monopoly, each subperiodic increment comprising a subperiodic difference between value derived from the goods covered by the patent monopoly under conditions of the patent monopoly and the corresponding values in the hypothetical environment without the patent monopoly, said each subperiodic increment being associated with a different subperiod;
      computing a discounted present value of the patent monopoly as aggregate present value of the subperiodic increments of the patent monopoly by discounting said each subperiodic increment to present value using the discount interest rate of the subperiod associated with said each subperiodic increment, and aggregating the discounted subperiodic increments over all subperiods of the applicable period; and
      dividing the discounted present value of the patent monopoly by 1 to obtain the average subperiodic value $\nabla$.

83. A computer-implemented method according to claim 82, wherein the step of computing the average subperiodic value $\nabla$ further comprises the step of adjusting the average subperiodic value $\nabla$ to reflect
   (I) one or more probabilities of one or more patents of the portfolio being infringed, and
   (II) at least one of the following probabilities:
      (A) one or more probabilities of one or more patents of the portfolio being enforced, and
      (B) one or more probabilities of one or more patents of the portfolio being enforced successfully;
wherein the step of adjusting the average subperiodic value $\nabla$ is performed before the step of dividing the total value of the patent monopoly by 1.

84. A computer-implemented method according to claim 82, wherein the step of computing the average subperiodic value $\nabla$ further comprises the step of adjusting the average subperiodic value $\nabla$ to reflect
   (I) one or more probabilities of one or more patents of the portfolio being infringed, and
   (II) one or more probabilities of one or more patents of the portfolio being enforced, and (III) one or more probabilities of one or more patents of the portfolio being enforced successfully;

wherein the step of adjusting the average subperiodic value $\nabla$ is performed before the step of dividing the total value of the patent monopoly by 1.

85. The computer-implemented method of claim 84, wherein the values derived from the goods covered by the patent monopoly under conditions of the monopoly and the corresponding values in the hypothetical environment without the patent monopoly are gross profits.

86. The computer-implemented method of claim 84, wherein the values derived from the goods covered by the patent monopoly under conditions of the monopoly and the corresponding values in the hypothetical environment without the patent monopoly are net profits.

87. The computer-implemented method of claim 84, wherein the values derived from the goods covered by the patent monopoly under conditions of the monopoly and the corresponding values in the hypothetical environment without the patent monopoly are gross revenues.

88. The computer-implemented method of claim 83, wherein:
(A) the information sufficient to compute $\nabla$ comprises a number $\langle PRFT \rangle_i$ indicating profits derived from sales of the goods covered by the patent monopoly under conditions of the monopoly during the subperiod i, a number $PRFT_i$ indicating profits derived from sales of the goods in the hypothetical environment without the patent monopoly during the subperiod i, and a number $I_i$ indicating the discount interest rate for the subperiod i;
(B) the step of computing a plurality of subperiodic increments comprises the step of computing the plurality of subperiodic increments according to the formula $\Delta_i = \langle PRFT \rangle_i - PRFT_i$, wherein $\Delta_i$ denotes a subperiodic increment of the subperiod i;
(C) the step of computing a discounted present value comprises the steps of computing the discounted present value of the patent monopoly according to the formula $$PV(PP) = \sum_{i=1}^{i=I} \frac{\Delta_i}{(1+I_i)^i},$$

wherein PV(PP) denotes the discounted present value of the patent monopoly; and
(D) the step of adjusting comprises the step of adjusting the discounted present value of the patent monopoly, to obtain an adjusted present value of the patent monopoly, according to the formula $AdjPV(PP)=(1-P\times(1-E\times F))\times PV(PP)$, wherein:
AdjPV(PP) denotes the adjusted present value of the patent monopoly,
P denotes a probability that at least one patent of the patent portfolio will be infringed,
E denotes a probability that the patent portfolio will be enforced, and
F denotes a probability that the patent portfolio will be enforced successfully.

89. The computer-implemented method of claim 84, wherein:
(A) the information sufficient to compute $\nabla$ comprises a number $\langle PRFT \rangle_i$ indicating profits derived from sales of the goods covered by the patent monopoly under conditions of the monopoly during the subperiod i, a number $PRFT_i$ indicating profits derived from sales of the goods in the hypothetical environment without the patent monopoly during the subperiod i, and a number $I_i$ indicating the discount interest rate for the subperiod i;
(B) the step of computing a plurality of subperiodic increments comprises the step of computing the plurality of subperiodic increments according to the formula $\Delta_i = \langle PRFT \rangle_i - PRFT_i$, wherein $\Delta_i$ denotes a subperiodic increment of the subperiod i;
(C) the step of computing a discounted present value comprises the steps of computing the discounted present value of the patent monopoly according to the formula $$PV(PP) = \sum_{i=1}^{i=I} \frac{\Delta_i}{(1+I_i)^i},$$

wherein PV(PP) denotes the discounted present value of the patent monopoly; and
(D) the step of adjusting comprises the step of adjusting the discounted present value of the patent monopoly, to obtain an adjusted present value of the patent monopoly, according to the formula $AdjPV(PP)=(1-P\times(1-E\times F))\times PV(PP)$, wherein:
AdjPV(PP) denotes the adjusted present value of the patent monopoly,
P denotes a probability that at least one patent of the patent portfolio will be infringed,
E denotes a probability that the patent portfolio will be enforced, and
F denotes a probability that the patent portfolio will be enforced successfully.

90. The computer-implemented method of claim 89, wherein the patent portfolio is owned by an owner, the step of adjusting further comprising the steps of:
receiving from the input device, through the computer communication network, information sufficient to estimate a probability $E_w$ of the owner being willing to enforce the patent monopoly during the applicable period;
receiving from the input device, through the computer communication network, information sufficient to estimate a probability $E_a$ of the owner being able to enforce the patent monopoly during the applicable period; and
computing E by multiplying $E_w$ by $E_a$.

91. The computer-implemented method of claim 90, further comprising the step of computing the probability F according to the formula: $F=1-(1-F_v\times F_i\times F_e)^n$, wherein:
$F_v$ denotes a probability that any individual patent of the patent portfolio will be found not invalid;
$F_e$ denotes a probability that any individual patent of the patent portfolio will be found not unenforceable; and
$F_i$ denotes a probability that any individual patent of the patent portfolio will be found infringed during the applicable period.

92. The computer-implemented method of claim 89, further comprising the step of computing the probability F according to the formula:

$$F = 1 - \prod_{j=1}^{n}(1 - F_v^j \times F_i^j \times F_e^j),$$

wherein:
- (I) $F_v^j$ denotes a probability that the $j^{th}$ patent of the patent portfolio will be found not invalid, for $1 \leq j \leq n$;
- (II) $F_e^j$ denotes a probability that the $j^{th}$ patent of the patent portfolio will be found not unenforceable, for $1 \leq j \leq n$; and
- (III) $F_i^j$ denotes a probability that the $j^{th}$ patent of the patent portfolio will be found infringed during the applicable period, for $1 \leq j \leq n$.

93. A computer-implemented method according to claim 72, wherein the step of computing the average subperiodic value $\bar{V}$ comprises the steps of:
  (i) computing a plurality of subperiodic increments of the patent monopoly according to the formula $C_i = (\langle PR \rangle_i - \langle CG \rangle_i) \times \langle S \rangle_i - (PR_i - CG_i) \times S_i$, wherein:
    - (I) $\langle PR \rangle_i$ is an average unit price of goods covered by the patent portfolio during the subperiod i under the patent monopoly of the patent portfolio,
    - (II) $\langle CG \rangle_i$ is an average unit cost of the goods during the subperiod i under the patent monopoly,
    - (III) $\langle S \rangle_i$ is unit sales volume of the goods during the subperiod i under the patent monopoly,
    - (IV) $PR_i$ is an average unit price of the goods during the subperiod i in a hypothetical environment without the patent monopoly,
    - (V) $CG_i$ is an average unit cost of the goods during the subperiod i in the hypothetical environment without the patent monopoly,
    - (VI) $S_i$ is unit sales volume of the goods during the subperiod i in the hypothetical environment without the patent monopoly, and
    - (VII) $C_i$ is a subperiodic increment of the subperiod i; and
  (ii) obtaining discount interest rates for the subperiods of the applicable period;
  (iii) computing a discounted present value of the patent monopoly as aggregate present value of the subperiodic increments of the patent monopoly by discounting each subperiodic increment to present value using the discount interest rate of the subperiod associated with said each subperiodic increment, and aggregating the discounted subperiodic increments over all subperiods; and
  (iv) dividing the discounted present value of the patent monopoly by l to obtain the average subperiodic value $\bar{V}$.

94. A computer-implemented method according to claim 93, wherein the step of determining discount interest rates comprises the step of determining discount interest rates for the subperiods of the applicable periods based on uncertainties associated with forecasting future revenues and risk of infringement of the patent monopoly.

95. A computer-implemented method according to claim 71, wherein:
  (I) the information comprises an interest rate I and a subperiodic increment $\Delta$; and
  (III) the step of computing the average subperiodic value $\bar{V}$ comprises the step of computing the average subperiodic value $\bar{V}$ according to the formula $$PV(P) = \Delta \times \left[ \frac{1 - \left[\frac{1}{(1+I)^l}\right]}{I} \right],$$

wherein PV(P) denotes the discounted present value of the patent monopoly.

96. A computer-implemented method of computing an estimate of value EV of a first patent of a patent portfolio providing patent monopoly over an applicable period, the applicable period comprising a plurality of l subperiods, the patent portfolio comprising a plurality of n patents, the method comprising the steps of:
  (a) receiving through a computer communication network information sufficient to:
    (i) obtain an average subperiodic value $\bar{V}$ of the patent portfolio over the applicable period, and
    (ii) generate a plurality of matrix elements $p_i^j$, each matrix element $p_i^j$ reflecting relative contribution of $j^{th}$ patent to the patent portfolio during subperiod i of the applicable period;
  (b) a step for obtaining the average subperiodic value $\bar{V}$ of the patent portfolio over the applicable period from the information;
  (c) a step for generating the plurality of matrix elements $p_i^j$, one matrix element $p_i^j$ per combination of the $j^{th}$ patent and the subperiod i, so that the following relationship is satisfied for $1 \leq i \leq l$:

$$\sum_{j=1}^{n} p_i^j = K,$$

where K is a constant;
  (d) a step for computing a first patent weight index $p^1$ for the first patent;
  (e) computing the estimate of value EV of the first patent according to the formula $$EV = \frac{p^1}{K} \times \bar{V};$$

and
  (f) providing the estimate of value EV through an output device;
wherein at least the steps (b) and (e) are performed using one or more computing devices.

* * * * *

UNITED STATES PATENT AND TRADEMARK OFFICE
CERTIFICATE OF CORRECTION

PATENT NO.       : 7,606,757 B1
APPLICATION NO.  : 10/638802
DATED            : October 20, 2009
INVENTOR(S)      : Alexander I. Poltorak It is certified that error appears in the above-identified patent and that said Letters Patent is hereby corrected as shown below:

Column 27, line 12, cancel "1 subperiods," and replace the cancelled text with --$l$ subperiods,--;

Column 27, line 21, cancel "$1 \leq i \leq 1$:" and replace the cancelled text with --$1 \leq i \leq l$:--;

Column 28, line 39, cancel "by 1 to" and replace the cancelled text with --by $l$ to--;

Column 28, line 53, cancel "monopoly by 1," and replace the cancelled text with --monopoly by $l$.--;

Column 29, line 10, cancel "monopoly by 1 to" and replace the cancelled text with --monopoly by $l$ to--;

Column 29, line 25, cancel "monopoly by 1," and replace the cancelled text with --monopoly by $l$.--;

Column 29, line 38, cancel "monopoly by 1." and replace the cancelled text with --monopoly by $l$.--;

Column 31, line 40, cancel "they" and replace the cancelled text with --the--;

Column 32, line 11, cancel "monopoly by 1 to" and replace the cancelled text with --monopoly by $l$ to--;

Column 32, line 44, cancel "1 subperiods," and replace the cancelled text, with --$l$ subperiods,--;

Column 32, line 53, cancel "$1 \leq i \leq 1$:" and replace the cancelled text with --$1 \leq i \leq l$:--;

Column 33, line 16, cancel "1 subperiods," and replace the cancelled text with --$l$ subperiods,--:

Column 33, line 24, cancel "$1 \leq i \leq 1$;" and replace the cancelled text with --$1 \leq i \leq l$:--;

Column 34, line 54, cancel "monopoly by 1 to" and replace the cancelled text with --monopoly by $l$ to--;

Column 35, line 3, cancel "monopoly by 1." and replace the cancelled text with --monopoly by $l$.--;

Column 35, line 27, cancel "monopoly by 1 to" and replace the cancelled text with --monopoly by $l$ to--;

Column 35, line 43, cancel "monopoly by 1." and replace the cancelled text with --monopoly by $l$.--;

Column 35, line 57, cancel "monopoly by 1." and replace the cancelled text with --monopoly by $l$.--;

Column 37, line 48, cancel "$f_i$ denotes" and replace the cancelled text with --$F_i$ denotes--;

Column 38, line 41, cancel "monopoly by 1 to" and replace the cancelled text with --monopoly by $l$ to--;

Column 39, line 17, cancel "1 subperiods," and replace the cancelled text with --$l$ subperiods,--;

Column 39, line 26, cancel "$1 \leq i \leq 1$:" and replace the cancelled text with --$1 \leq i \leq l$:--;

Column 39, line 51, cancel "1 subperiods," and replace the cancelled text with --$l$ subperiods,--;

CERTIFICATE OF CORRECTION (continued)
U.S. Pat. No. 7,606,757 B1

Column 40, line 2, cancel "$1 \leq i \leq 1$:" and replace the cancelled text with --$1 \leq i \leq l$:--;

Column 41, line 25, cancel "by/to" and replace the cancelled text with --by $l$ to--;

Column 41, line 27, cancel "monopoly by 1," and replace the cancelled text with --monopoly by $l$,--;

Column 42, line 21, cancel "1 subperiods," and replace the cancelled text with --$l$ subperiods,--;

Column 43, line 63, cancel "monopoly by 1 to" and replace the cancelled text with --monopoly by $l$ to--;

Column 44, line 10, cancel "monopoly by 1." and replace the cancelled text with --monopoly by $l$.--;

Column 44, line 43, cancel "monopoly by 1 to" and replace the cancelled text with --monopoly by $l$ to--;

Column 44, line 59, cancel "monopoly by 1." and replace the cancelled text with --monopoly by $l$.--;

Column 45, line 5, cancel "monopoly by 1." and replace the cancelled text with --monopoly by $l$.--;

Column 47, line 44, cancel "monopoly by 1 to" and replace the cancelled text with --monopoly by $l$ to--;

Column 48, line 15, cancel "1 subperiods," and replace the cancelled text with --$l$ subperiods,--;

Column 48, line 32, cancel "$1 \leq i \leq 1$:" and replace the cancelled text with --$1 \leq i \leq l$:--;

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,606,757 B1
APPLICATION NO. : 10/638802
DATED : October 20, 2009
INVENTOR(S) : Alexander I. Poltorak It is certified that error appears in the above-identified patent and that said Letters Patent is hereby corrected as shown below:

Column 27, line 12, cancel "1 subperiods," and replace the cancelled text with --$l$ subperiods,--;

Column 27, line 21, cancel "$1 \leq i \leq 1$:" and replace the cancelled text with --$1 \leq i \leq l$:--;

Column 28, line 39, cancel "by 1 to" and replace the cancelled text with --by $l$ to--;

Column 28, line 53, cancel "monopoly by 1." and replace the cancelled text with --monopoly by $l$.--;

Column 29, line 10, cancel "monopoly by 1 to" and replace the cancelled text with --monopoly by $l$ to--;

Column 29, line 25, cancel "monopoly by 1." and replace the cancelled text with --monopoly by $l$.--;

Column 29, line 38, cancel "monopoly by 1." and replace the cancelled text with --monopoly by $l$.--;

Column 31, line 40, cancel "they" and replace the cancelled text with --the--;

Column 32, line 11, cancel "monopoly by 1 to" and replace the cancelled text with --monopoly by $l$ to--;

Column 32, line 44, cancel "1 subperiods," and replace the cancelled text, with --$l$ subperiods,--;

Column 32, line 53, cancel "$1 \leq i \leq 1$:" and replace the cancelled text with --$1 \leq i \leq l$:--;

Column 33, line 16, cancel "1 subperiods," and replace the cancelled text with --$l$ subperiods,--;

Column 33, line 24, cancel "$1 \leq i \leq 1$;" and replace the cancelled text with --$1 \leq i \leq l$:--;

Column 34, line 54, cancel "monopoly by 1 to" and replace the cancelled text with --monopoly by $l$ to--;

Column 35, line 3, cancel "monopoly by 1." and replace the cancelled text with --monopoly by $l$.--;

Column 35, line 27, cancel "monopoly by 1 to" and replace the cancelled text with --monopoly by $l$ to--;

Column 35, line 43, cancel "monopoly by 1." and replace the cancelled text with --monopoly by $l$.--;

Column 35, line 57, cancel "monopoly by 1." and replace the cancelled text with --monopoly by $l$.--;

Column 37, line 48, cancel "$f_i$ denotes" and replace the cancelled text with --$F_i$ denotes--;

Column 38, line 41, cancel "monopoly by 1 to" and replace the cancelled text with --monopoly by $l$ to--;

Column 39, line 17, cancel "1 subperiods," and replace the cancelled text with --$l$ subperiods,--;

Column 39, line 26, cancel "$1 \leq i \leq 1$:" and replace the cancelled text with --$1 \leq i \leq l$:--;

Column 39, line 51, cancel "1 subperiods," and replace the cancelled text with --$l$ subperiods,--;

CERTIFICATE OF CORRECTION (continued)
U.S. Pat. No. 7,606,757 B1

Column 40, line 2, cancel "$1 \leq i \leq 1$:" and replace the cancelled text with --$1 \leq i \leq l$:--;

Column 41, line 25, cancel "by/to" and replace the cancelled text with --by $l$ to--;

Column 41, line 27, cancel "monopoly by 1," and replace the cancelled text with --monopoly by $l$,--;

Column 42, line 21, cancel "1 subperiods," and replace the cancelled text with --$l$ subperiods,--;

Column 43, line 63, cancel "monopoly by 1 to" and replace the cancelled text with --monopoly by $l$ to--;

Column 44, line 10, cancel "monopoly by 1." and replace the cancelled text with --monopoly by $l$.--;

Column 44, line 43, cancel "monopoly by 1 to" and replace the cancelled text with --monopoly by $l$ to--;

Column 44, line 59, cancel "monopoly by 1." and replace the cancelled text with --monopoly by $l$.--;

Column 45, line 5, cancel "monopoly by 1." and replace the cancelled text with --monopoly by $l$.--;

Column 47, line 44, cancel "monopoly by 1 to" and replace the cancelled text with --monopoly by $l$ to--;

Column 48, line 15, cancel "1 subperiods," and replace the cancelled text with --$l$ subperiods,--;

Column 48, line 32, cancel "$1 \leq i \leq 1$:" and replace the cancelled text with --$1 \leq i \leq l$:--;

This certificate supersedes the Certificate of Correction issued January 12, 2010.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,606,757 B1                                    Page 1 of 1
APPLICATION NO.  : 10/638802
DATED            : October 20, 2009
INVENTOR(S)      : Alexander I. Poltorak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1659 days.

Signed and Sealed this

Twelfth Day of October, 2010

David J. Kappos
*Director of the United States Patent and Trademark Office*